US012776853B2

(12) United States Patent
Takeda et al.

(10) Patent No.: US 12,776,853 B2
(45) Date of Patent: Oct. 27, 2026

(54) TECHNIQUES FOR DOWNLINK CONTROL INFORMATION SIZE ALIGNMENT AND MONITORING FOR INACTIVE CELLS

(71) Applicant: QUALCOMM Incorporated, San Diego, CA (US)

(72) Inventors: Kazuki Takeda, Minato-ku (JP); Peter Gaal, San Diego, CA (US); Jae Ho Ryu, San Diego, CA (US); Heechoon Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 762 days.

(21) Appl. No.: 18/169,091

(22) Filed: Feb. 14, 2023

(65) Prior Publication Data

US 2024/0275518 A1 Aug. 15, 2024

(51) Int. Cl.
*H04L 1/00* (2006.01)
*H04L 5/00* (2006.01)
(Continued)

(52) U.S. Cl.
CPC ............ *H04L 1/0008* (2013.01); *H04L 5/001* (2013.01); *H04L 5/0053* (2013.01);
(Continued)

(58) Field of Classification Search
CPC ... H04L 1/0008; H04L 5/0053; H04L 1/0052; H04L 5/001; H04L 5/0098; H04L 1/0046; H04W 72/232; H04W 72/23
See application file for complete search history.

(56) References Cited

U.S. PATENT DOCUMENTS

| | | | | |
|---|---|---|---|---|
| 12,095,708 | B2 * | 9/2024 | Lin | H04L 5/0092 |
| 12,245,249 | B2 * | 3/2025 | Yi | H04L 5/001 |

(Continued)

FOREIGN PATENT DOCUMENTS

| | | | |
|---|---|---|---|
| AU | 2021304710 | A1 | 2/2023 |
| WO | 2016123393 | A1 | 8/2016 |
| WO | 2022066599 | A1 | 3/2022 |

OTHER PUBLICATIONS

Merias P (Moderator (Lenovo))., et al., "Feature Lead Summary#4 On Multi-Cell PUSCH/PDSCH Scheduling With A Single DCI", 3GPP Draft, 3GPP TSG RAN WG1 Meeting #111, R1-2212923, Type Discussion, NR_MC_ENH-Core, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 21, 2022, XP052223460, pp. 1-112, section 3.2 "Qualcomm".

(Continued)

*Primary Examiner* — Mounir Moutaouakil
(74) *Attorney, Agent, or Firm* — HOLLAND & HART LLP

(57) ABSTRACT

Methods, systems, and devices for wireless communications are described. A user equipment (UE) may monitor a downlink channel for one or more downlink control information (DCI) messages, including a first set of DCI messages that schedule a single cell and a second set of DCI messages that schedule a set of cells. The UE may, based on a threshold, perform a first size alignment operation to reduce a quantity of different sizes of DCI messages included in the second set of DCI messages. The UE may then perform a second size alignment operation to further reduce the quantity of different sizes of DCI messages included in the first set of DCI messages based on the first size alignment operation. The UE may determine payload sizes of the DCI when the DCI (Continued)

schedules one or more inactive or dormant cells, which may support efficient decoding and alignment of multiple DCI.

30 Claims, 14 Drawing Sheets

(51) Int. Cl.
*H04W 72/232* (2023.01)
*H04W 72/23* (2023.01)

(52) U.S. Cl.
CPC ......... *H04W 72/232* (2023.01); *H04L 1/0052* (2013.01); *H04W 72/23* (2023.01)

(56) References Cited

U.S. PATENT DOCUMENTS

| | | | | |
|---|---|---|---|---|
| 12,317,259 | B2* | 5/2025 | Takeda | H04L 1/0061 |
| 12,342,333 | B2* | 6/2025 | Takeda | H04W 72/121 |
| 12,457,603 | B2* | 10/2025 | Khoshnevisan | H04W 72/1268 |
| 2021/0227517 | A1 | 7/2021 | Yi et al. | |
| 2023/0217456 | A1* | 7/2023 | Yi | H04L 5/001 370/329 |
| 2023/0254857 | A1* | 8/2023 | Moon | H04B 17/24 370/329 |

OTHER PUBLICATIONS

Partial International Search Report—PCT/US2024/014502—ISA/EPO—Jun. 4, 2024.

Qualcomm Incorporated: "Views On Multi-Cell POSCH Scheduling Via a Single DCI", 3GPP Draft, 3GPP TSG-RAN WG1 #102-e, R1-2006834, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051918284, pp. 1-4, figure 1, section 3.

ZTE: "Discussion On Multi-Cell PDSCH Scheduling Via A Single DCI", 3GPP Draft, 3GPP TSG RAN WG1 Meeting #102-e, R1-2005441, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917466, pp. 1-9, section 2.3.1, table 1, section 2.3.2.

International Search Report and Written Opinion—PCT/US2024/014502—ISA/EPO—Jul. 25, 2024.

* cited by examiner

TECHNIQUES FOR DOWNLINK CONTROL INFORMATION SIZE ALIGNMENT AND MONITORING FOR INACTIVE CELLS

FIELD OF TECHNOLOGY

The following relates to wireless communications, including techniques for downlink control information size alignment and monitoring for inactive cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for downlink control information (DCI) size alignment and monitoring for inactive cells. For example, the described techniques provide for efficient techniques for determining DCI payload size when inactive or dormant cells are present, along with extended or enhanced DCI alignment procedures to support additional DCI formats. For example, a user equipment (UE) may perform a first alignment step to determine the payload size of one or more additional DCI formats that support multi-cell scheduling. The UE may then perform an additional alignment step to align the sizes of the additional DCI formats with one another, and to align the additional DCI formats with other existing DCI formats that support single-cell scheduling. Additionally or alternatively, a UE may implement various techniques to determine a size of a DCI format that includes information for one or more inactive or dormant cells. For example, the UE may determine fields of the DCI which correspond to the inactive cells, and may either include or exclude those fields of the DCI when determining the size of the DCI.

A method for wireless communication at a UE is described. The method may include monitoring for a set of multiple DCI messages including a first set of DCI messages that schedule a single cell and a second set of DCI messages that schedule a set of cells, performing, based on the monitoring, a first size alignment operation to reduce a quantity of different sizes of the set of multiple DCI messages included in the second set of DCI messages based on the quantity satisfying a threshold, and performing a second size alignment operation to reduce the quantity of different sizes of the set of multiple DCI messages included in the first set of DCI messages based on performing the first size alignment operation.

An apparatus for wireless communication at a UE is described. The apparatus may include a processor, memory coupled with the processor, and instructions stored in the memory. The instructions may be executable by the processor to cause the apparatus to monitor for a set of multiple DCI messages including a first set of DCI messages that schedule a single cell and a second set of DCI messages that schedule a set of cells, perform, based on the monitoring, a first size alignment operation to reduce a quantity of different sizes of the set of multiple DCI messages included in the second set of DCI messages based on the quantity satisfying a threshold, and perform a second size alignment operation to reduce the quantity of different sizes of the set of multiple DCI messages included in the first set of DCI messages based on performing the first size alignment operation.

Another apparatus for wireless communication at a UE is described. The apparatus may include means for monitoring for a set of multiple DCI messages including a first set of DCI messages that schedule a single cell and a second set of DCI messages that schedule a set of cells, means for performing, based on the monitoring, a first size alignment operation to reduce a quantity of different sizes of the set of multiple DCI messages included in the second set of DCI messages based on the quantity satisfying a threshold, and means for performing a second size alignment operation to reduce the quantity of different sizes of the set of multiple DCI messages included in the first set of DCI messages based on performing the first size alignment operation.

A non-transitory computer-readable medium storing code for wireless communication at a UE is described. The code may include instructions executable by a processor to monitor for a set of multiple DCI messages including a first set of DCI messages that schedule a single cell and a second set of DCI messages that schedule a set of cells, perform, based on the monitoring, a first size alignment operation to reduce a quantity of different sizes of the set of multiple DCI messages included in the second set of DCI messages based on the quantity satisfying a threshold, and perform a second size alignment operation to reduce the quantity of different sizes of the set of multiple DCI messages included in the first set of DCI messages based on performing the first size alignment operation.

In some examples of the method, apparatuses, and non-transitory computer-readable medium described herein, performing the first size alignment operation may include operations, features, means, or instructions for performing the first size alignment operation on a first size and a second size of the quantity of different sizes of the set of multiple DCI messages included in the second set of DCI messages, the first size alignment operation including padding the first size or the second size with a quantity of filler bits such that the first size and the second size may be equal.

In some examples of the method, apparatuses, and non-transitory computer-readable medium described herein, performing the second size alignment operation may include operations, features, means, or instructions for performing the second size alignment operation on a first size and a second size of the quantity of different sizes of the set of multiple DCI messages included in the first set of DCI messages, the second size alignment operation including padding the first size or the second size with a quantity of filler bits such that the first size and the second size may be equal.

Some examples of the method, apparatuses, and non-transitory computer-readable medium described herein may further include operations, features, means, or instructions for determining that the quantity of different sizes of the set of multiple DCI messages satisfies the threshold after performing the first size alignment operation, where performing the second size alignment operation may be based on the determination.

Some examples of the method, apparatuses, and non-transitory computer-readable medium described herein may further include operations, features, means, or instructions for determining that the quantity of different sizes of the set of multiple DCI messages satisfies the threshold after performing the first size alignment operation and the second size alignment operation, determining, based on determining that the quantity satisfies the threshold after performing the first size alignment operation and the second size alignment operation, a first size of the quantity of different sizes of the set of multiple DCI messages included in the first set of DCI messages and a second size of the quantity of different sizes of the set of multiple DCI messages included in the second set of DCI messages, and performing a third size alignment operation by padding the first size or the second size with a quantity of filler bits such that the first size and the second size may be equal.

In some examples of the method, apparatuses, and non-transitory computer-readable medium described herein, the first set of DCI messages that schedule the single cell may be associated with a first set of control channel elements (CCEs) and the second set of DCI messages that schedule the set of cells may be associated with a second set of CCEs different from the first set of CCEs.

In some examples of the method, apparatuses, and non-transitory computer-readable medium described herein, the set of multiple DCI messages included in the second set of DCI messages and in the first set of DCI messages may be configured for a same reference cell.

In some examples of the method, apparatuses, and non-transitory computer-readable medium described herein, DCI messages included in the second set of DCI messages may have a larger size than DCI messages included in the first set of DCI messages based on the second set of DCI messages scheduling the set of cells.

In some examples of the method, apparatuses, and non-transitory computer-readable medium described herein, the threshold includes a total threshold quantity of different sizes of DCI messages, a total threshold quantity of different sizes of DCI messages scrambled with cell-specific radio network temporary identifiers, or both.

A method for wireless communication at a UE is described. The method may include monitoring for a first DCI format that schedules a set cells via a set of multiple fields, each field of the set of multiple fields indicating a scheduling for one or more cells of the set of cells configured for the first DCI format, where the one or more cells include an inactive cell and communicating, via the one or more cells based on the scheduling, a first DCI format having a size that is based on the size of a field corresponding to the inactive cell.

An apparatus for wireless communication at a UE is described. The apparatus may include a processor, memory coupled with the processor, and instructions stored in the memory. The instructions may be executable by the processor to cause the apparatus to monitor for a first DCI format that schedules a set cells via a set of multiple fields, each field of the set of multiple fields indicating a scheduling for one or more cells of the set of cells configured for the first DCI format, where the one or more cells include an inactive cell and communicating, via the one or more cells base at least in part on the scheduling, a first DCI format having a size that is based on the size of a field corresponding to the inactive cell.

Another apparatus for wireless communication at a UE is described. The apparatus may include means for monitoring for a first DCI format that schedules a set cells via a set of multiple fields, each field of the set of multiple fields indicating a scheduling for one or more cells of the set of cells configured for the first DCI format, where the one or more cells include an inactive cell and means for communicating, via the one or more cells based on the scheduling, a first DCI format having a size that is based on the size of a field corresponding to the inactive cell.

A non-transitory computer-readable medium storing code for wireless communication at a UE is described. The code may include instructions executable by a processor to monitor for a first DCI format that schedules a set cells via a set of multiple fields, each field of the set of multiple fields indicating a scheduling for one or more cells of the set of cells configured for the first DCI format, where the one or more cells include an inactive cell and communicating, via the one or more cells base at least in part on the scheduling, a first DCI format having a size that is based on the size of a field corresponding to the inactive cell.

Some examples of the method, apparatuses, and non-transitory computer-readable medium described herein may further include operations, features, means, or instructions for monitoring a set of control parameters included in a reference bandwidth part (BWP) configuration to identify a field of the set of multiple fields that corresponds to the inactive cell and determining the size of the first DCI format as a total size of the set of multiple fields including the field that corresponds to the inactive cell, where communicating the first DCI format may be based on determining the size of the first DCI format.

Some examples of the method, apparatuses, and non-transitory computer-readable medium described herein may further include operations, features, means, or instructions for monitoring a set of control parameters included in a reference BWP configuration to identify a field of the set of multiple fields that corresponds to the inactive cell and determining the size of the first DCI format as a total size of the set of multiple fields excluding the field that corresponds to the inactive cell, where communicating the first DCI format may be based on determining the size of the first DCI format.

In some examples of the method, apparatuses, and non-transitory computer-readable medium described herein, one cell of the one or more cells is an active cell and remaining cells of the one or more cells are inactive cells, and the method, apparatuses, and non-transitory computer-readable medium may include further operations, features, means, or instructions for monitoring respective control parameters included in respective reference BWP configurations that correspond to the inactive cells to identify respective fields of the set of multiple fields that correspond to the inactive cells and determining the size of the first DCI format as a total size of the set of multiple fields including or excluding the respective fields that correspond to the inactive cells, where communicating the first DCI format may be based on determining the size of the first DCI format.

In some examples of the method, apparatuses, and non-transitory computer-readable medium described herein, one cell of the one or more cells is an active cell and remaining cells of the one or more cells are inactive cells, and the method, apparatuses, and non-transitory computer-readable medium may include further operations, features, means, or instructions for refraining from monitoring for the first DCI format based on the remaining cells of the one or more cells being inactive.

In some examples of the method, apparatuses, and non-transitory computer-readable medium described herein, one cell of the one or more cells is an active cell and remaining cells of the one or more cells are inactive cells, and the method, apparatuses, and non-transitory computer-readable medium may include further operations, features, means, or instructions for refraining from monitoring for the first DCI format based on the remaining cells of the one or more cells being inactive and monitoring for one or more DCI formats by excluding a quantity of CCEs or blind decoding candidates corresponding to the first DCI format.

Some examples of the method, apparatuses, and non-transitory computer-readable medium described herein may further include operations, features, means, or instructions for receiving the one or more DCI formats via the quantity of CCEs or blind decoding candidates corresponding to the first DCI format.

In some examples of the method, apparatuses, and non-transitory computer-readable medium described herein, a reference cell of the one or more cells may be inactive and the method, apparatuses, and non-transitory computer-readable medium may include further operations, features, means, or instructions for refraining from monitoring for the first DCI format based on the reference cell being inactive.

In some examples of the method, apparatuses, and non-transitory computer-readable medium described herein, a reference cell of the one or more cells may be inactive and the method, apparatuses, and non-transitory computer-readable medium may include further operations, features, means, or instructions for monitoring for the first DCI format based on including a quantity of CCEs or blind decoding candidates corresponding to the first DCI format.

In some examples of the method, apparatuses, and non-transitory computer-readable medium described herein, a reference cell of the one or more cells may be inactive and the method, apparatuses, and non-transitory computer-readable medium may include further operations, features, means, or instructions for selecting a cell that may be different from the reference cell to monitor for the first DCI format and monitoring for the first DCI format on the cell that may be different from the reference cell based on including a quantity of CCEs or blind decoding candidates corresponding to the first DCI format.

In some examples of the method, apparatuses, and non-transitory computer-readable medium described herein, the selecting may be based on a serving cell index associated with the cell.

In some examples of the method, apparatuses, and non-transitory computer-readable medium described herein, the set of multiple fields include at least a first field type that indicates configuration values on a multi-cell basis for the set of cells configured for the first DCI format, and a second field type that indicates configuration values on a per-cell basis for the one or more cells of the set of cells configured for the first DCI format.

DETAILED DESCRIPTION

Figure 1:
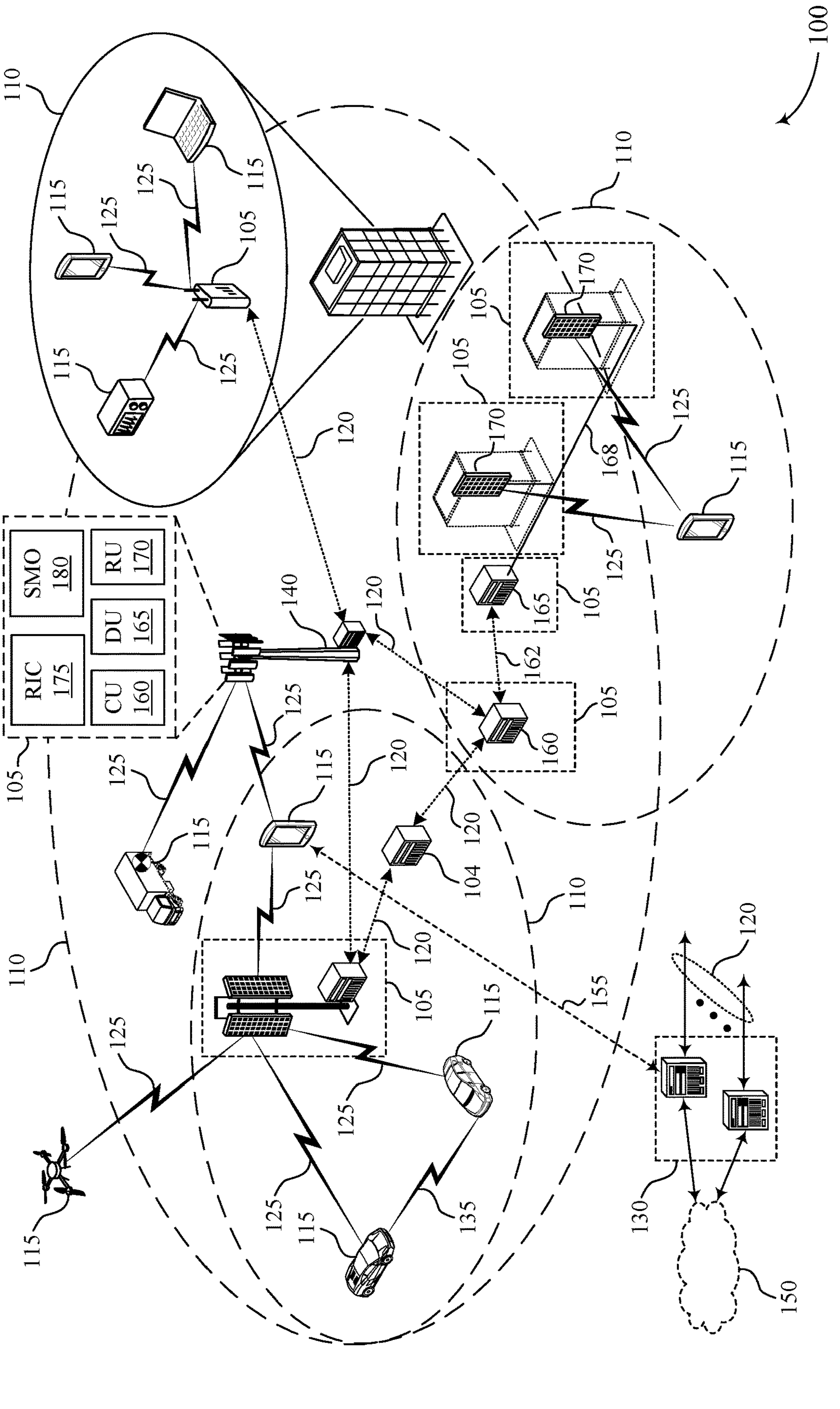
FIG. 1 illustrates an example of a wireless communications system that supports techniques for downlink control information (DCI) size alignment and monitoring for inactive cells in accordance with one or more aspects of the present disclosure.

Some wireless communications systems may support multiple different downlink control information (DCI) formats, including DCI formats that support single cell scheduling, DCI formats that support multi-cell scheduling, or both. Each of these different DCI formats may have different payload sizes based on various factors such as the quantity of type of scheduling information included in each DCI format, the number of cells scheduled by each DCI format, among other factors.

To support efficient decoding of multiple different DCI format sizes, a user equipment (UE) may support decoding for one or more threshold quantities of different DCI sizes. For example, a UE may support capabilities of decoding four different sizes of DCI messages within a time frame. Increasing the quantity of sizes of the DCI messages that a UE can decode within a time frame may increase decoding complexities and costs. Using such threshold quantities of sizes for decoding may reduce the potential decoding and processing complexity for the UE.

The UE may also support decoding for new or updated DCI formats for multi-cell scheduling in addition to other DCI formats for single-cell scheduling. The implementation of additional DCI formats, however, may increase blind decoding complexity for the UE as more different DCI payload sizes become possible. Additionally or alternatively, such additional DCI formats may include multiple different field types which may correspond to the scheduling of either inactive or dormant cells, which may be accounted for or ignored when determining the size of a DCI format.

To reduce the decoding complexity at the UE and to support the decoding of additional DCI formats, the UE may support DCI size alignment procedures (or extended DCI size alignment procedures). For example, a UE may support one or more additional DCI formats (e.g., DCI format 0_X and DCI format 1_X), which may have different payload sizes, and which may further have different payload sizes from existing DCI formats. For example, DCI format 0_X and DCI format 1_X may support multi-cell scheduling and may be associated with different payload sizes from DCI formats that support single-cell scheduling (such as DCI formats 0_0, 1_0, 0_1, 1_1, 0_2, and 1_2). To align the sizes of the multiple different DCI formats, the UE may perform a first alignment step to determine the payload size of the additional DCI formats, and may perform one or more additional alignment steps to align the sizes of the additional DCI formats and to align the additional DCI formats with the existing DCI formats.

In some implementations, the UE may implement various techniques to determine a size of a DCI format that schedules or includes information for one or more inactive or dormant cells. For example, the UE may determine fields of the DCI which correspond to the inactive cells, and may either include or exclude those fields of the DCI when determining the size of the DCI. In some other examples where a relatively significant quantity of cells are inactive for the DCI, the UE may refrain from monitoring the DCI to save power and blind decoding resources.

Aspects of the disclosure are initially described in the context of wireless communications systems. Aspects of the disclosure are further illustrated by and described with reference to DCI size determination and alignment processes, DCI size determination and monitoring processes, process flows, apparatus diagrams, system diagrams, and flowcharts that relate to techniques for DCI size alignment and monitoring for inactive cells.

FIG. 1 illustrates an example of a wireless communications system 100 that supports techniques for DCI size alignment and monitoring for inactive cells in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for DCI size alignment and monitoring for inactive cells as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (CCEs) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems may use DCI to send dynamic physical layer control messages from the network to each UE. For example, this information may be broadcast system-wide or may be UE-specific, and may include uplink and downlink data scheduling information, HARQ management information, power control parameters, among other example information.

DCI may use a number of different formats, each serving a different usage, for example, for the scheduling of PUSCH transmissions or for the receiving of PDSCH transmissions. Each DCI format may include a set of fields, where each field conveys information, such the frequency resource assignment, time resource assignment, redundancy version, and modulation and coding information. The number of bits associated with a field may be fixed, or may be dependent on various other factors such as the active BWP size. In some examples, different DCI formats may have a number of different payload sizes, which may undergo size alignment to simplify blind decoding at a UE and to reduce the total number of different payload sizes that a UE searches for. As the quantity of different sizes of DCI messages increases, the UE may search for the quantity of different sizes, which may increase the search complexity for the UE. To reduce decoding complexity for the UE, DCI sizes may be aligned using the padding of zero bits (e.g., padding smaller DCI format with a number of zero bits or filler bits to align the size of the smaller DCI to a larger DCI format), bit truncation (e.g., truncating a number of bits of a larger DCI format to align with a smaller DCI format), or both.

In some examples, a UE may monitor for scheduling information from DCI associated with one or more cells, such as DCI associated with a primary cell (e.g., PSCell or PCell) and DCI associated with one or more secondary cells (e.g., sSCell or SCell). In some examples, a monitored DCI from either the PSCell or the SCell can schedule the SCell, such that one scheduled cell (e.g., the SCell) could have two different scheduling cells (e.g., the PSCell and the SCell). For example, a non-fallback DCI format on SCell may support SCell scheduling, while the same non-fallback DCI format on SCell may be used for PSCell scheduling.

In some cases, a UE may determine the DCI sizes for one scheduled cell that is scheduled by two scheduling cells using parameters of each scheduling cell (e.g., DCI of the PSCell may be determined from various RRC parameters of PSCell and DCI of the SCell may be determined from parameters of SCell). In some cases, however, the PSCell or the SCell may be deactivated or dormant such that the RRC parameters from the PSCell or the SCell are unknown. For example, if the SCell is deactivated, the RRC parameters associated with the SCell may be unknown to the UE. In such examples, the UE may determine the original size of the DCI associated with the SCell based on a BWP identity (e.g., the firstActiveDownlinkBWP-Id) of the SCell. In other examples where the active BWP of SCell is associated with a dormant BWP, the UE may determine the original size of the DCI based on various other BWP identities associated with the SCell (e.g., the firstWithinActiveTimeBWP-Id if provided or otherwise, the firstOutsideActiveTimeBWP-Id). In some other examples, if the SCell is deactivated and if the firstActiveDownlinkBWP-Id of the SCell is set to be a dormant BWP, the UE may determine the original size of the DCI based on various other BWP identities associated with the SCell (e.g., the firstWithinActiveTimeBWP-Id if provided or otherwise, the firstOutsideActiveTimeBWP-Id).

Additionally or alternatively, BWP switching of the PSCell and the SCell may change the size of non-fallback (NFB) DCIs on the PSCell and the SCell for PSCell scheduling. For example, BWP-switching of the PSCell and the SCell may additionally change the size of NFB DCIs on the SCell or the PSCell for PSCell scheduling (e.g., if BWP switch occurs on PSCell, this changes the DCI size on the PScell which may also change the corresponding DCI size on the SCell). In some other examples, if the SCell has two BWPs and one of the BWPs is a dormant BWP, the DCI size may not change.

In some examples, a UE may support multi-cell scheduling for PUSCH, for PDSCH, or both (e.g., one PDSCH or PUSCH per cell), using a single DCI that schedules multiple cells. In such examples, a DCI format may simultaneously schedule a relative maximum number of cells. For example, a single DCI may schedule two or more cells for the multi-cell PUSCH and PDSCH scheduling. In some cases, the scheduling may support both intra-band and inter-band carrier aggregation operation, and may be operable on different frequency ranges such as FR1 and FR2 frequency ranges. In some examples, a different multi-cell scheduling DCI formats (e.g., DCI format 0_X and DCI format 1_X) may schedule one or more PUSCHs on up to four cells. In such examples, the DCI formats may support frequency domain resource assignment (FDRA) as a field that includes one or more bits used for FDRA for two or more cells, and where different fields for different cells may be co-scheduled by a DCI format 0_X or DCI format 1_X. Additionally or alternatively, parameters such as MCS, NDI, RV, and HARQ process number may be per-cell fields of the DCI. Additional parameters such as parameters configuring one or more antenna ports may also be configurable between per-cell fields or single-fields of the DCI (e.g., applying to all the co-scheduled cell(s)).

For a cell within a set of cells that may be co-scheduled by a DCI format 0_X, a DCI format 1_X, or both, and the UE may monitor for the DCI formats 0_X and 1_X in addition to other DCI formats (e.g., any or all DCI formats 0_0, 1_0, 0_1, 1_1, 0_2, 1_2) configured from a same scheduling cell. For example, the UE may monitor the DCI formats 0_X and 1_X simultaneously with one or more of the DCI formats 0_0, 1_0, 0_1, 1_1, 0_2, 1_2. For example, if a multi-cell DCI (e.g., MC-DCI) is configured for four different component carriers (CCs) {1, 2, 3, 4}, the UE may monitor the DCI formats 0_0/1_0, 0_1/1_1, 0_2/1_2 for each of CCs {1, 2, 3, 4} simultaneously on the same scheduling CC. In such examples, a carrier 0 may act as a scheduling cell for CCs {1, 2, 3, 4}, and the UE may support monitoring for one or more of the DCI formats 0_0/1_0, 0_1/1_1, 0_2/1_2 and DCI formats 0_X and 1_X on each of the CCs {1, 2, 3, 4}. Additionally or alternatively, the UE may monitor each single cell or CC individually for single-cell DCI (SC-DCI).

In some examples, a DCI size budget may be maintained for each cell of a set of cells for a set of cells configured for multi-cell scheduling, and the DCI size of DCI formats 0_X and 1_X may be counted on one cell (e.g., a reference cell) of the set of cells. In addition, a blind decoding budget or a quantity of control channel elements (e.g., CCEs) associated with the DCI format 0_X and 1_X may be counted one once cell (e.g., a reference cell) of the set of cells. In such examples, the same reference cell may be used for DCI formats 0_X and 1_X. The reference cell may be the scheduling cell if the scheduling cell is included in the set of cells and the search space of the DCI format 0_X and 1_X is configured on the scheduling cell. In some examples, a cell (on which the DCI format 0_X and 1_X is configured) may be associated with the search space of the scheduling cell with the same search space ID if the search space of the DCI format 0_X and 1_X is configured on the cell in addition to the scheduling cell. For example, a network entity may determine which cell the search space of the DCI formats 0_X and 1_X is configured for. In some examples, the blind decoding or CCE limit for any given cell may not exceed a threshold limit or a counting rule. For example, the number of blind decodes, CCEs, or a DCI-size of MC-DCIs may be determined on a reference cell amongst the cells in the set of cells configured for the MC-DCIs. In some implementations, the number of blind decodes in a blind decoding budget may be equal to 36 blind decodes per cell or CC. In some examples, if one CC is configured as a reference cell (e.g., if a group of CCs is configured as CC0, CC1, CC2 CC3 and CC4, and CC-3 is configured as the reference cell) the total number of blind decodes for the MC-DCI may be counted on the reference cell (e.g., CC-3).

To support efficient decoding of multiple different DCI format sizes, a UE 115 may support decoding for a threshold number of different DCI sizes (e.g., four unique DCI payload sizes) or a threshold number of DCI sizes scrambled with C-RNTI (e.g., three unique DCI payload sizes scrambled by C-RNTI). Such threshold values for decoding may reduce the potential decoding and processing complexity for the UE 115. The UE 115 may also support decoding for new or updated DCI formats for multi-cell scheduling in addition to existing DCI formats for single-cell scheduling. The addition of additional DCI formats, however, may increase blind decoding complexity for the UE 115 as more different DCI payload sizes become possible. Additionally or alternatively, such additional DCI formats may include multiple different field types which may correspond to the scheduling of either inactive or dormant cells, which may be accounted for or ignored when determining the size of a DCI format.

To reduce the decoding complexity at the UE 115 and to support the decoding of additional DCI formats, the UE 115 may support DCI various size alignment procedures. For example, the UE 115 may support one or more additional DCI formats (e.g., DCI format 0_X and DCI format 1_X) which may have different payload sizes, and which may further have different payload sizes from existing DCI formats. For example, DCI format 0_X and DCI format 1_X may support multi-cell scheduling and may be associated with different payload sizes from DCI formats that support single-cell scheduling (such as DCI formats 0_0, 1_0, 0_1, 1_1, 0_2, and 1_2). To align the sizes of the multiple different DCI formats, the UE 115 may perform a first alignment step to determine the payload size of the additional DCI formats, and may perform one or more additional alignment steps to align the sizes of the additional DCI formats and to align the additional DCI formats with the existing DCI formats.

In some other implementations, the UE 115 may implement various techniques to determine a size of a DCI format that schedules or includes information for one or more inactive or dormant cells. For example, the UE 115 may determine fields of the DCI which correspond to the inactive cells, and may either include or exclude those fields of the DCI when determining the size of the DCI. In some other examples where a relatively significant quantity of cells are inactive for the DCI, the UE 115 may refrain from monitoring the DCI to save power and blind decoding resources.

Figure 2:
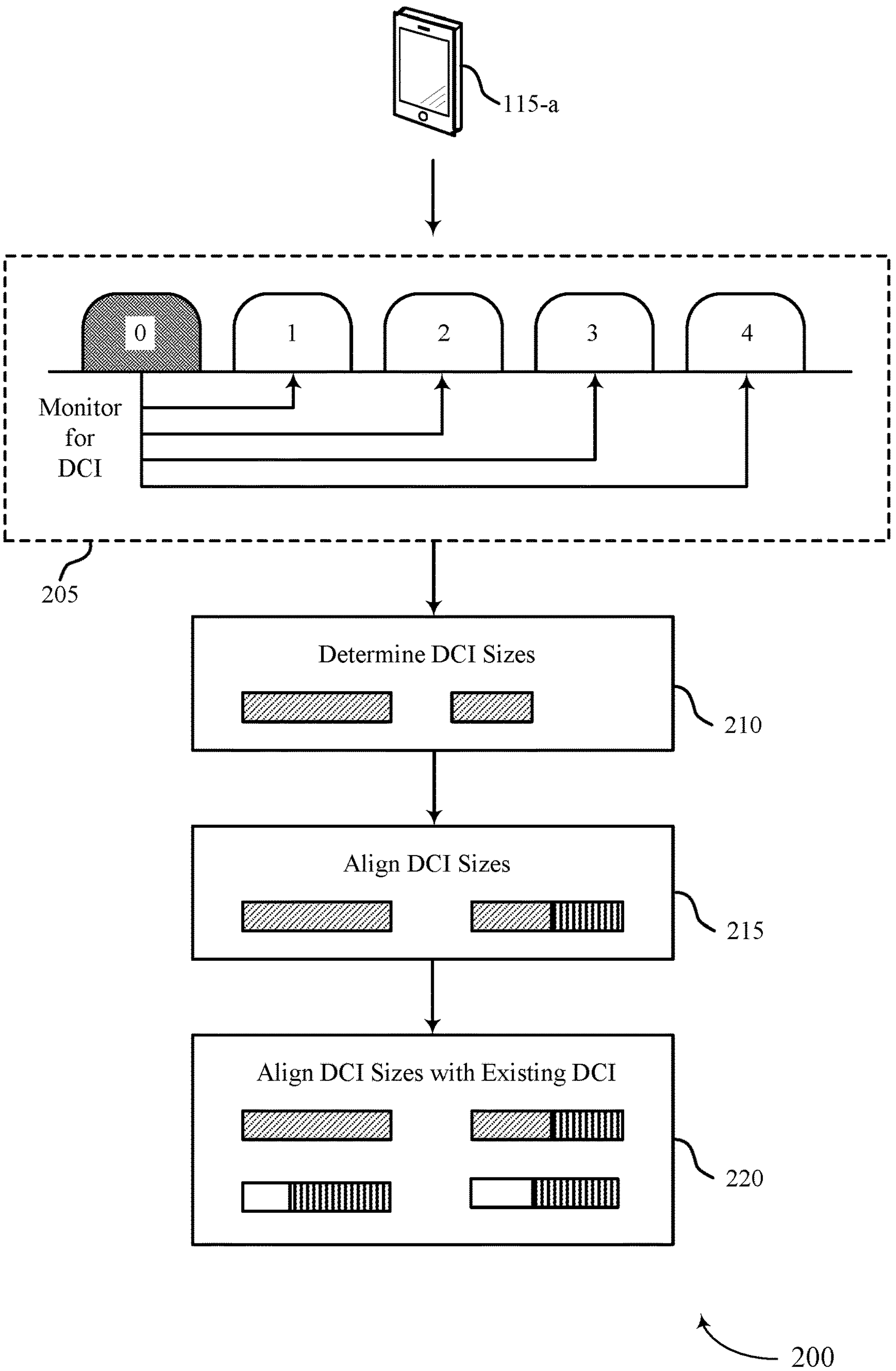
FIG. 2 illustrates an example of a DCI size determination and alignment process that supports techniques for DCI size alignment and monitoring for inactive cells in accordance with one or more aspects of the present disclosure.

FIG. 2 illustrates an example of a DCI size determination and alignment process 200 that supports techniques for DCI size alignment and monitoring for inactive cells in accordance with one or more aspects of the present disclosure. For example, the DCI size determination and alignment process 200 may be performed at or by a UE 115-*a*, which may be an example of a UE 115 described with reference to FIG. 1.

Some wireless communications systems may support multiple different DCI formats, including DCI formats that support single cell scheduling, and some DCI formats that support multi-cell scheduling. Each of these different DCI formats may have different payload sizes and may support scheduling for downlink communications or uplink communications for different sets of cells and different cell configurations. In some implementations, however, a UE may support decoding for a threshold number of different DCI sizes (e.g., four unique DCI payload sizes) or a threshold number of DCI sizes scrambled with C-RNTI (e.g., three unique DCI payload sizes scrambled by C-RNTI). Such threshold values for decoding may reduce the potential decoding and processing complexity for the UE 115-*a*. A system may also support the addition of new or updated DCI formats for multi-cell scheduling and other DCI formats that support extended scheduling. The addition of additional DCI formats, however, may increase blind decoding complexity for the UE 115-*a* as more different DCI payload sizes become possible. Additionally or alternatively, such additional DCI formats may include multiple different field types which may correspond to the scheduling of either inactive or dormant cells, which may be accounted for or ignored when determining the size of a DCI format.

To reduce the decoding complexity at the UE 115-*a* and to support the introduction of additional DCI formats, some wireless communications systems may support DCI size alignment procedures (or extended DCI size alignment procedures). For example, a UE may support one or more additional DCI formats (e.g., DCI format 0_X and DCI format 1_X) which may have different payload sizes, and which may further have different payload sizes from existing DCI formats. For example, DCI format 0_X and DCI format 1_X may support multi-cell scheduling and may be associated with different payload sizes from DCI formats that support single-cell scheduling (such as DCI formats 0_0, 1_0, 0_1, 1_1, 0_2, and 1_2).

Based on the addition of DCI formats 0_X and 1_X, the UE 115-*a* may support an extended DCI size alignment procedure which includes a quantity of DCI alignment steps. The DCI alignment procedure may align the multiple DCI formats such that the UE 115-*a* decodes no more than a threshold number of DCI sizes (e.g., four unique DCI payload sizes) and no more than a threshold number of DCI sizes scrambled with C-RNTI (e.g., three DCI payload sizes scrambled with C-RNTI). In some examples, the UE 115-*a* may align the sizes of one or more of the DCI formats 0_0, 1_0, 0_1, 1_1, 0_2, and 1_2, and then may align the sizes of DCI formats 0_X and 1_X configured on a same reference cell. Then, the UE 115-*a* may align the sizes of DCI formats 0_X and 1_X with the DCI one or more aligned DCI formats 0_0, 1_0, 0_1, 1_1, 0_2, and 1_2 configured on the same reference cell. In some examples, the UE 115-*a* may differentiate between DCI formats 0_X and 1_X and the other DCI formats using a different set of CCEs configured for the DCI formats 0_X and 1_X and the other DCI formats.

To perform DCI size alignment for the quantity of different DCI payload sizes, the UE 115-*a* (and/or a network entity 105 described with reference to FIG. 1) may perform various size alignment steps for common search space (CSS) and UE-specific search space (USS) DCI formats. In some cases, aspects of these processes may also be performed by the network entity 105 as part of encoding and transmitting the DCI formats. This description is largely from the perspective of the UE 115-*a* without loss of understanding. At 205, the UE 115-*a* may monitor a set of cells 0, 1, 2, 3, and 4 for single-cell scheduling DCI and multi-cell scheduling DCI. Then at 210, the UE 115-*a* may perform steps 0 through 2B to determine DCI sizes corresponding to one or more of the DCI formats 0_0, 1_0, 0_1, 1_1, 0_2, 1_2, 0_X and 1_X. For example, the DCI formats may have sizes A, B, C, D, E, F, G, and H. Specifically, the UE 115-*a* may perform steps 0 through 2A to determine the sizes of single-cell scheduling DCI, and may perform step 2B to determine the sizes of multi-cell scheduling DCI 0_X and 1_X. For example, the steps 0 through 2B for the determining the DCI sizes is illustrated in Table 1.

TABLE 1

| DCI Size Determination | | | | | |
|---|---|---|---|---|---|
| | Step 0 | Step 1 | Step 2 | Step 2A | Step 2B |
| CSS DCI 0_0 | Size A (padding if 0_0 > 1_0; FDRA truncate if 0_0 < 1_0) | | | | |
| CSS DCI 1_0 | Size A | | | | |
| USS DCI 0_0 | | Size B (padding if 0_0 < 1_0) | | | |
| USS DCI 1_0 | | Size B (padding if 0_0 > 1_0) | | | |

TABLE 1-continued

| DCI Size Determination | | | | | |
|---|---|---|---|---|---|
| | Step 0 | Step 1 | Step 2 | Step 2A | Step 2B |
| USS DCI 0_1 | | | Size C (+1 bit if aligned with size B) | | |
| USS DCI 1_1 | | | Size D (+1 bit if aligned with size B) | | |
| USS DCI 0_2 | | | | Size E | |
| USS DCI 1_2 | | | | Size F | |
| USS DCI 0_X | | | | | Size G |
| USS DCI 1_X | | | | | Size H |

After performing steps 0 through 2B, the UE 115-*a* may perform a third step (e.g., step 3), where the UE 115-*a* (and/or the network entity 105) may identify the number of different DCI payload sizes present. In step 3, if no more than four distinct DCI sizes are present (and no more than three DCI sizes scrambled with C-RNTI), the UE 115-*a* may perform decoding on the different DCI. If there are more than four distinct DCI sizes present (and more than three DCI sizes scrambled with C-RNTI), the UE 115-*a* (and/or the network entity 105) may perform a DCI size alignment procedure at 215 to align the sizes of the DCI for decoding. To perform the DCI size alignment procedure, the UE 115-*a* (and/or the network entity 105) may perform steps 4A-0, 4A, 4B, 4C, 4D, or any combination thereof, as described with reference to Table 2. The rows of Table 2 correspond to the rows of Table 1. However, the labeling for the rows of Table 2 is omitted due to space constraints.

TABLE 2

| DCI Size Alignment | | | | |
|---|---|---|---|---|
| Step 4A-0 | Step 4A | Step 4B | Step 4C | Step 4D |
| Size A | Size A | Size A | Size A | Size A |
| Size A | Size A | Size A | Size A | Size A |
| Size B | Size B => Size A (padding if 0_0 > 1_0; FDRA truncate if 0_0 < 1_0) | Size A | Size A | Size A |
| Size B | Size B => Size A | Size A | Size A | Size A |
| Size C | Size C (remove the +1 bit in Step 2 if any) | Size C | Size C => Size C/D (padding if 0_1 < 1_1) | Size C/D => Size C/D/G/H (padding if 0_1/1_1 < 0_X/1_X) |
| Size D | Size D (remove the +1 bit in Step 2 if any) | Size D | Size D => Size C/D (padding if 0_1 > 1_1) | Size C/D => Size C/D/G/H (padding if 0_1/1_1 < 0_X/1_X) |
| Size E | Size E | Size E => Size E/F (padding if 0_2 < 1_2) | Size E/F | Size E/F |
| Size F | Size F | Size F => Size E/F (padding if 0_2 > 1_2) | Size E/F | Size E/F |
| Size G => Size G/H (padding if 0_X < 1_X) | Size G/H | Size G/H | Size G/H | Size G/H => Size C/D/G/H (padding if 0_1/1_1 > 0_X/1_X) |
| Size H => Size G/H (padding if 0_X > 1_X) | Size G/H | Size G/H | Size G/H | Size G/H => Size C/D/G/H (padding if 0_1/1_1 > 0_X/1_X) |

For example, in step 4A-0 the UE 115-*a* may align the DCI formats 0_X and 1_X based on the sizes of the DCI formats. For example, the DCI format 0_X may have size G, and the DCI 1_X may have size H. In some examples, the UE 115-*a* may perform DCI align the size G with the size H by padding if the DCI format 0_X is smaller than the DCI format 1_X. Additionally or alternatively, the UE 115-*a* may align the size H with the size G to a size G/H by padding the format 0_X if the format 0_X is larger than the format 1_X.

In step 4A, the DCI size B may be aligned with size A, in step 4B, size E may be aligned with size F (e.g., size E/F), and in step 4C, size C may be aligned with size D (e.g., size C/D). For example, a smaller DCI size may be padded with a quantity of zero bits in order to achieve a size that is aligned with the larger DCI size. In step 4D, for example, at 220, the DCI sizes may be further aligned to achieve a threshold number of allowed different DCI sizes. For example, the DCI size C/D may be aligned with DCI size G/H to a common size C/D/G/H. Then, the size G/H may be aligned with C/D/G/H via padding of the relatively smaller DCI format.

After performing DCI alignment steps 4A-0 through 4D, the UE 115-*a* may again identify the number of different DCI payload sizes present. If no more than four distinct DCI sizes are present (and no more than three DCI sizes scrambled with C-RNTI), the UE 115-*a* may perform decoding on the different size-aligned DCI.

Figure 3:
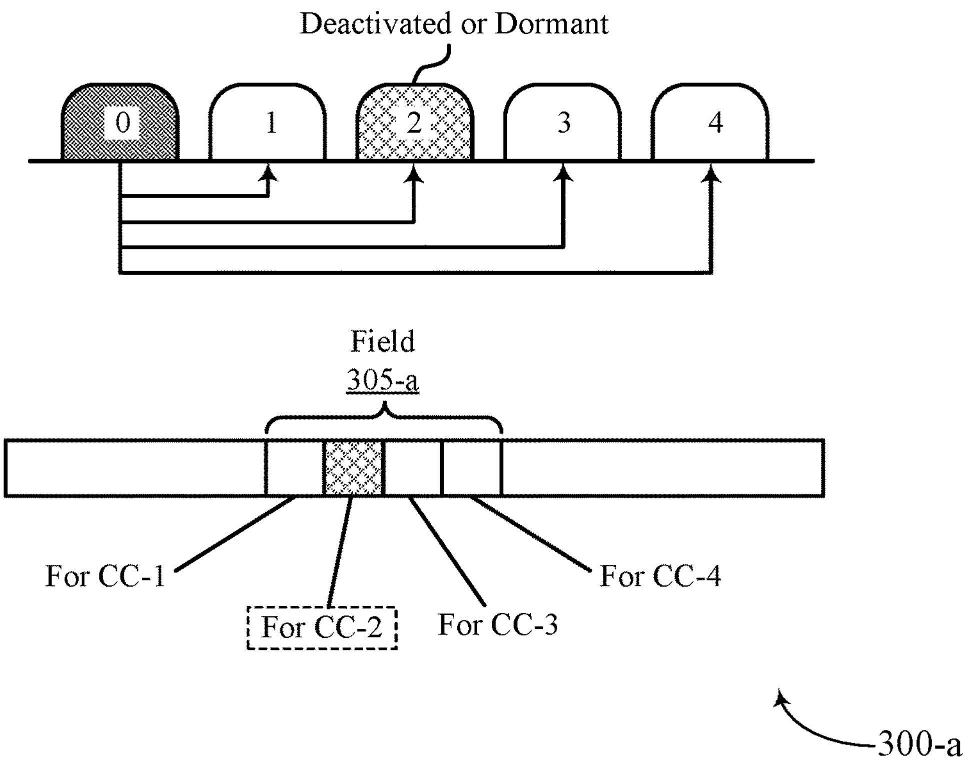
FIGS. 3 and 4 illustrate examples of DCI size determination and monitoring processes that support techniques for DCI size alignment and monitoring for inactive cells in accordance with one or more aspects of the present disclosure.
Figure 3:
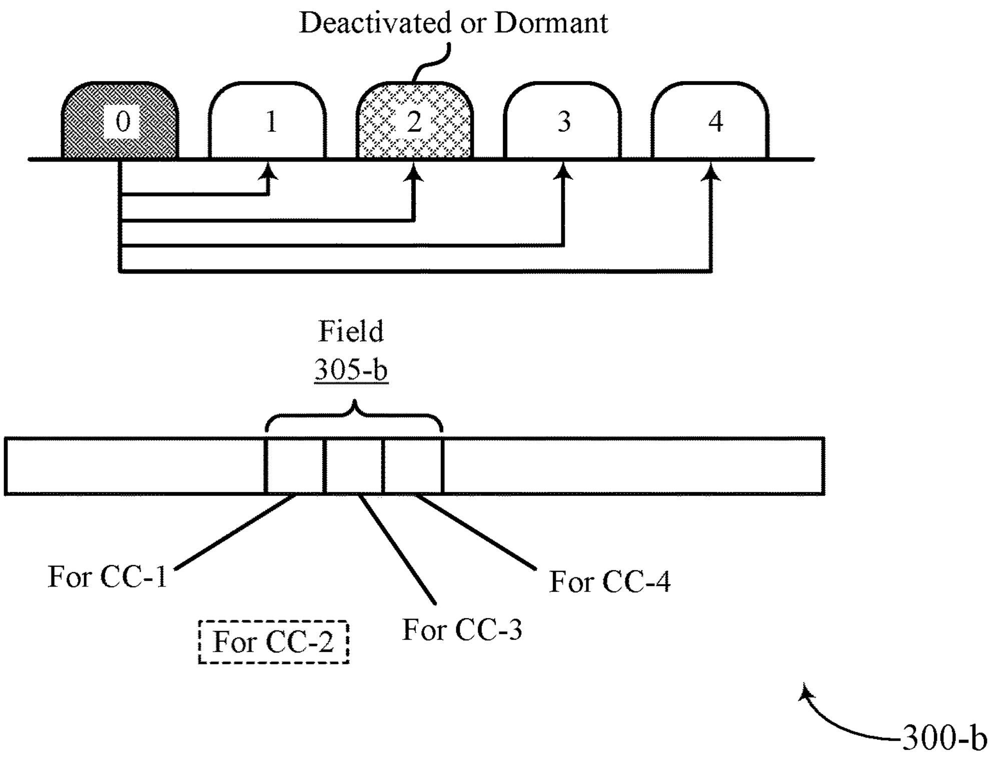

FIG. 3 illustrates an example of a DCI size determination and monitoring process 300-*a* and a DCI size determination and monitoring process 300-*b* that support techniques for DCI size alignment and monitoring for inactive cells in accordance with one or more aspects of the present disclosure. For example, the DCI size determination and monitoring process 300-*a* and the DCI size determination and monitoring process 300-*b* may be performed at or by a UE, which may be an example of a UE 115 described herein.

In some implementations, a multi-cell scheduling DCI format may have multiple field types. For example, a first field type (e.g., a type-1 field) may be a single field in the DCI which indicates one or more values for multiple cells in a set of cells configured for DCI format 0_X or DCI format 1_X. For example, a type-1 field may have a bit value of 1101 and that value may be interpreted as a parameter for each different cell being scheduled. In some examples, the type-1 field may include information such as TDRA information, TCI-state, BWP indicators, registration management (RM) indicators, and zero-power (ZP) CSI-RS indicators, among other information. The type-1 field included in the multi-cell scheduling DCI may have a same field value for different cells, but the field value may be interpreted differently for the different cells. In some other examples, a DCI may include a second field type (e.g., a type-2 field) which may be a per-cell field in the DCI for multiple cells in the set of cells configured for DCI format 0_X or DCI format 1_X. For example, a type-2 field may have individual bits values for each cell being scheduled-such as 1101 for cell 1, 1001 for cell 2, and 0011 for cell 3, if three cells are being scheduled. Thus, sizes of type-2 field may vary based on the quantity of cells being scheduled. A type-2 field may include information such as HARQ process number, redundancy version (RV), a new data indicator (NDI), modulation and coding scheme (MCS) parameters, and FDRA, among other values. The type-2 field included in the multi-cell scheduling DCI may have different values across different cells.

In some examples, however, one or more cells (e.g., SCells) scheduled by the multi-cell scheduling DCI may be deactivated or dormant. In such cases, the UE may implement various techniques to determine a size of DCI payload which includes fields (e.g., type-1 and type-2 fields) that may be dedicated to the deactivated or dormant cells.

For the DCI size determination and monitoring process 300-*a*, a multi-cell scheduling DCI corresponding to a scheduling cell or PSCell (e.g., cell 0) may schedule a set of multiple SCells or sSCells (e.g., cells 1, 2, 3, and 4), where one cell of the set of cells may be dormant or inactive. For example, cell 2 may be inactive. For such inactive or dormant cells, a UE may use a reference BWP to determine the fields of DCI format 0_X and 1_X on the dormant or inactive cell. For example, if an SCell is deactivated, the UE may use the parameter firstActiveDownlinkBWP-Id of the SCell to determine the fields of DCI 0_X and 1_X. Additionally or alternatively, if the active BWP of an SCell is associated with a dormant BWP, the UE may use the parameter firstWithinActiveTimeBWP-Id to determine the fields of DCI 0_X and 1_X (e.g., if the fields are indicated by the firstWithinActiveTimeBWP-Id parameter). Otherwise, the UE may use the firstOutsideActiveTimeBWP-Id parameter to determine the fields of DCI 0_X and 1_X. In some other examples, if the SCell is deactivated and if the firstActiveDownlinkBWP-Id of SCell is set to a dormant BWP, the active BWP of SCell may be the dormant BWP.

In some implementations that cell 2 is inactive or dormant, the UE may determine the total size of the field 305-*a* of the DCI (e.g., a type-1 field, a type-2 field, or both) by including bits used to schedule the deactivated or dormant cell 2. For example, in such implementations, the deactivated or dormant SCells are considered or included in the total size of the DCI. The UE may determine the size of the DCI fields by adding together the respective sizes of the scheduling information included for each cell (e.g., CC-1, CC-2, CC-3, and CC-4) determined using information on a reference bandwidth part. By including deactivated or dormant cells, the DCI size may remain constant for UE decoding.

For the DCI size determination and monitoring process 300-*b*, a multi-cell scheduling DCI corresponding to a scheduling cell or primary cell PCell or PSCell (e.g., cell 0) may schedule a set of multiple SCells or sSCells (e.g., cells 1, 2, 3, and 4), where one cell of the set of cells may be dormant or inactive. For example, cell 2 may be inactive. For such inactive or dormant cells, a UE may use a reference BWP to determine the fields of DCI format 0_X and 1_X on the dormant or inactive cell. In some examples, the UE may determine the total size of the field 305-*b* of the DCI (e.g., a type-1 field, a type-2 field, or both) by excluding bits used to schedule the deactivated or dormant cell 2. For example, in such implementations, the deactivated or dormant SCells are not considered in the total size of the DCI. The UE may determine the size of the DCI fields by adding together the respective sizes of the scheduling information included for each cell excluding the dormant cell (e.g., CC-1, CC-3, and CC-4) determined using information on a reference bandwidth part. Excluding the deactivated or dormant cell in the DCI size determination may reduce overall DCI overhead based on which SCells are active (and how many SCells are active).

Additionally or alternatively, SCell deactivation and SCell dormant BWP may effectively change the fields and total size of DCI formats 0_X and 1_X. Then, for DCI size alignment procedures between DCI formats 0_X and 1_X, the size change of DCI 0_X/1_X may correspondingly change the size of DCI 1_X/0_X. For example, if DCI size alignment between DCI formats 0_X and 1_X and other DCI formats (e.g., DCI formats 0_1/1_1) is used, the size change of DCI formats 0_X/1_X may also change the size of the legacy DCI formats that are aligned with DCI 0_X/1_X (e.g., DCI formats 0_1/1_1).

Figure 4:
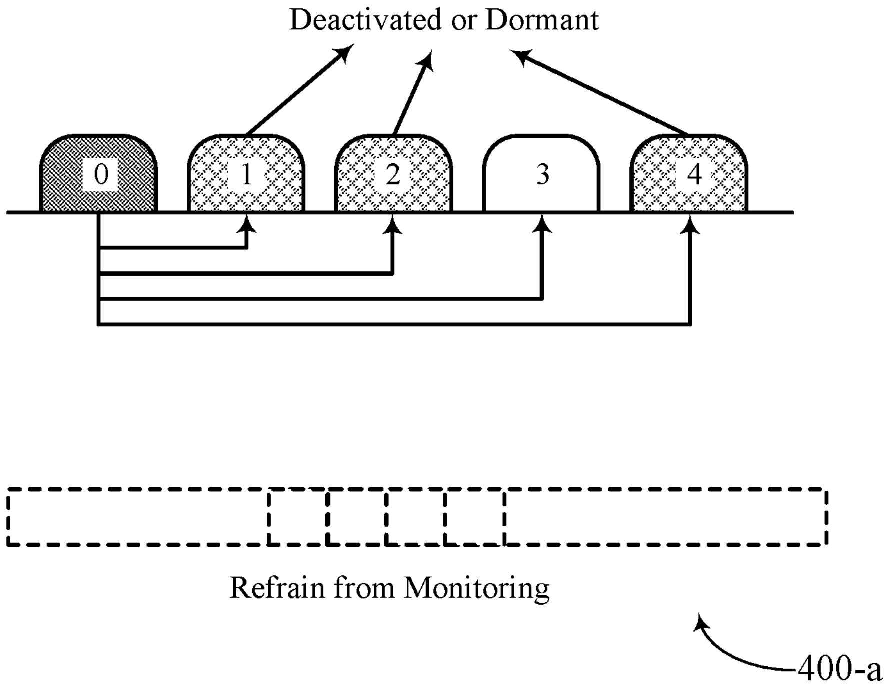
Figure 4:
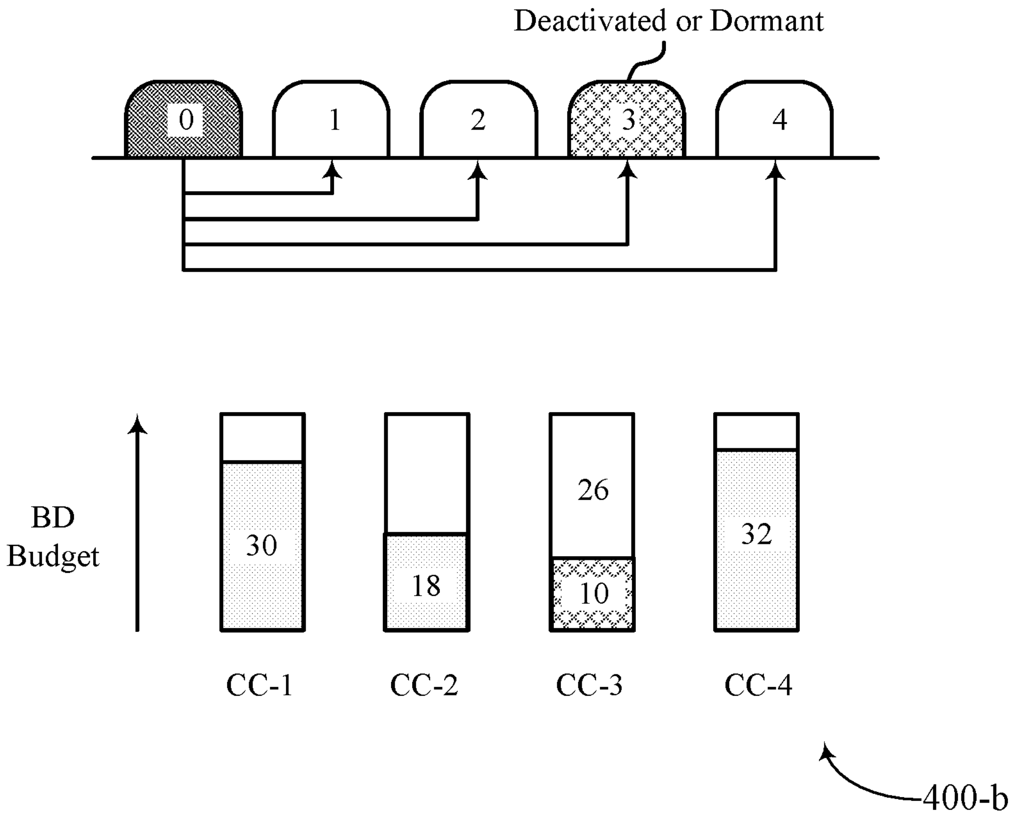

FIG. 4 illustrates an example of a DCI size determination and monitoring process 400-*a* and a DCI size determination and monitoring process 400-*b* that support techniques for DCI size alignment and monitoring for inactive cells in accordance with one or more aspects of the present disclosure. For example, the DCI size determination and monitoring process 400-*a* and the DCI size determination and monitoring process 400-*b* may be performed at or by a UE, which may be an example of a UE 115 described herein.

In some implementations, one or more cells (e.g., SCells) that are scheduled by a multi-cell scheduling DCI may be deactivated or dormant. In such cases, the UE may implement various techniques to determine a size of DCI payload which includes fields (e.g., type-1 and type-2 fields) that may be dedicated to the deactivated or dormant cells.

For the DCI size determination and monitoring process 400-*a*, a multi-cell scheduling DCI corresponding to a scheduling cell or PSCell (e.g., cell 0) may schedule a set of multiple SCells or sSCells (e.g., cells 1, 2, 3, and 4), where one cell of the set of cells may be active, with the remainder of the cells being dormant or inactive. For example, cell 3 may be active, with cells 1, 2, and 4 being inactive. In such examples, the UE may determine the total size of the field of the DCI (e.g., a type-1 field, a type-2 field, or both) by including bits used to schedule the deactivated or dormant cells. For example, in such implementations, the deactivated or dormant SCells are considered or included in the total size of the DCI. Additionally or alternatively, the UE may not consider the deactivated or dormant SCells in the total size of the DCI.

In some other examples, if all but one cell is inactive from a set of cells, the UE may refrain from monitoring for the DCI format 0_X and 1_X. For example, the UE may refrain from monitoring for the DCI format 0_X and 1_X, and may exclude blind decodes, CCE, DCI size for the DCI 0_X/1_X. In such examples, if DCI 0_X/1_X is monitored on the P(S)Cell, the unused BDs, CCEs, or both may be re-used for other DCI formats, which may reduce the quantity of dropped PDCCH candidates for the other DCI formats. Additionally or alternatively, if size alignment between DCI 0_X/1_X and other DCI formats is enabled, the UE may adjust the size of the DCI formats depending on whether the DCI size for the DCI 0_X/1_X is determined.

For the DCI size determination and monitoring process 400-*b*, a multi-cell scheduling DCI corresponding to a scheduling cell or PSCell (e.g., cell 0) may schedule a set of multiple SCells or sSCells (e.g., cells 1, 2, 3, and 4), where one cell of the set of cells may be inactive, with the remainder of the cells being active. For example, cell 3 may be inactive, and cells 1, 2, and 4 may be active. In addition, the reference cell where the quantity of blind decodes, CCEs, or DCI-size of the DCI format 0_X/1_X are counted on may be deactivated or dormant. In some such examples, the UE may refrain from monitoring the DCI formats 0_1 and 0_X. In some other examples, the UE may monitor the DCI formats 0_X and 1_X and may count the number of blind decodes CCEs and DCI-size on the deactivated cell (which may be based on the BWP having a BWP-ID that matches the firstActiveDownlinkBWP-Id, firstWithinActiveTimeBWP-Id, or firstOutsideActiveTimeBWP-Id. For example, the UE may have a threshold number of blind decodes (e.g., a blind decoding budget) for each cell CC-1, CC-2, CC-3, and CC-4, which may be equal to 36 total blind decodes per cell. The UE may have 30 blind decodes on CC-1, 18 blind decodes on CC-2, and 32 blind decodes on CC-4, and may not monitor SC-DCI for the 10 blind decodes on CC-3. The UE may still monitor MC-DCI for 26 blind decodes on CC-3. The number of blind decodes described herein may be understood in terms of example, and may have different values.

In some other examples, the UE may monitor the DCI format 0_X/1_X and may count the quantity of blind decodes, CCEs, or DCI-size on a different cell selected by a rule (e.g., based on a serving cell index). In such examples, the UE may refrain from monitoring other DCI formats 0_0, 1_0, 0_1, 1_1, 0_2, and 1_2 configured on the same dormant or deactivated cell. Additionally or alternatively, the UE may monitor DCI 0_X/1_X for one or more non-reference cells that are inactive or dormant.

Figure 5:
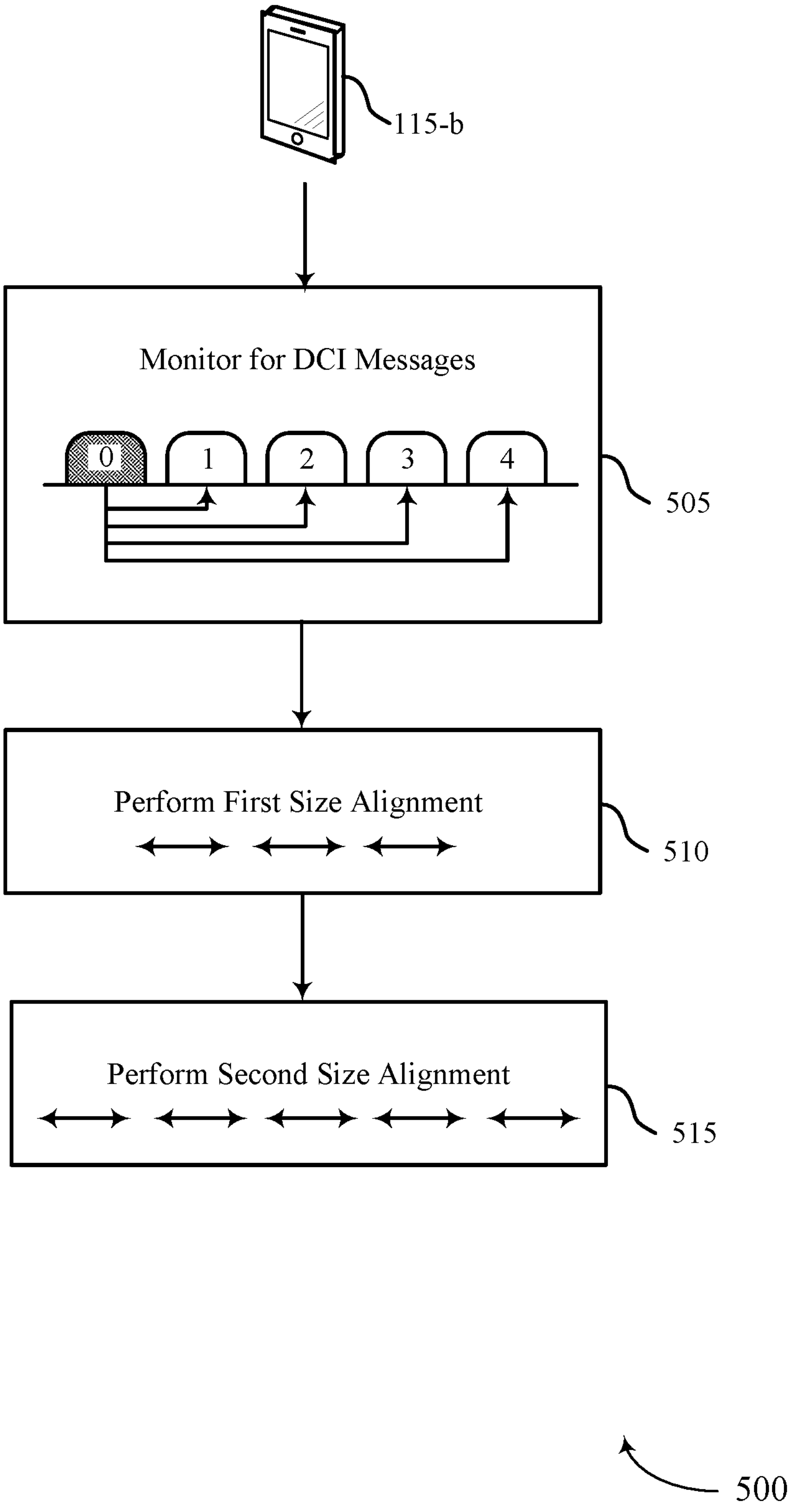
FIGS. 5 and 6 illustrate example process flows that support techniques for DCI size alignment and monitoring for inactive cells in accordance with one or more aspects of the present disclosure.

FIG. 5 illustrates an example of a process flow 500 that supports techniques for DCI size alignment and monitoring for inactive cells in accordance with one or more aspects of the present disclosure. The process flow 500 illustrates a DCI alignment procedure performed at a UE 115-*b*, which may be an example of a UE described herein. In the following description of process flow 500, the operations may be performed in a different order than the order shown, or other operations may be added or removed from the process flow 500. For example, some operations may also be left out of process flow 500, may be performed in different orders or at different times, or other operations may be added to process flow 500. Although the UE 115-*b* is shown performing the operations of process flow 500, some aspects of some operations may also be performed by one or more other wireless or network devices.

At 505, the UE 115-*b* may monitor for one or more DCI messages including a first set of DCI messages that schedule a single cell and a second set of DCI messages that schedule a set of cells. For example, the UE 115-*b* may monitor for a DCI format 0_X/1_X, which may schedule a set of cells (e.g., more than one cell). In some examples, the DCI 0_X/1_X may be used to schedule all cells in the set of cells, some of the cells of the set of cells, or one of the cells in the set of cells. In some examples, the first set of DCI messages that schedule the single cell are associated with a first set of CCEs and the second set of DCI messages that schedule the set of cells are associated with a second set of CCEs different from the first set of CCEs. Additionally or alternatively, the DCI messages included in the second set of DCI messages and in the first set of DCI messages are configured for a same reference cell, and the DCI messages included in the second set of DCI messages have a larger size than the DCI messages included in the first set of DCI messages.

At 510, the UE 115-*b* may perform, based on the monitoring, a first size alignment operation to reduce a quantity of different sizes of the DCI messages included in the second set of DCI messages. In some examples, the UE 115-*b* may perform the first size alignment operation based on the quantity of different sizes of DCI messages satisfying a threshold quantity. For example, the threshold the threshold may be a total threshold quantity of different sizes of DCI messages, a total threshold quantity of different sizes of DCI messages scrambled with C-RNTI, or both. In some examples, the first size alignment procedure may include performing a size alignment operation on a first size and a second size of the quantity of different sizes of the DCI messages included in the second set of DCI messages. The first size alignment operation may include padding the first size or the second size with a quantity of filler bits (e.g., zero bits) such that the first size and the second size are equal in length.

At 515, the UE 115-*b* may perform a second size alignment operation to reduce the quantity of different sizes of DCI messages included in the first set of DCI messages based on performing the first size alignment operation. In some examples, the second size alignment operation may include performing a size alignment on a first size and a second size of the different sizes of DCI messages included in the first set of DCI messages. The second size alignment operation may include padding the first size or the second size with a quantity of filler bits (e.g., zero bits) such that the first size and the second size are equal.

In some examples, the UE 115-*b* may determine that the quantity of different sizes of the DCI messages satisfies the threshold after performing the first size alignment operation, and the UE 115-*b* performs the second size alignment operation is based on the determination. In some other examples, the UE 115-*b* may determine that the quantity of different sizes of the DCI messages satisfy the threshold after performing the first size alignment operation and the second size alignment operation. The UE 115-*b* may then determine a first size of the quantity of different sizes of the DCI messages included in the first set of DCI messages and a second size of the quantity of different sizes of the DCI messages included in the second set of DCI messages. The UE 115-*b* may then perform a third size alignment operation by padding the first size or the second size with a quantity of filler bits (e.g., zero bits) such that the first size and the second size are equal.

Figure 6:
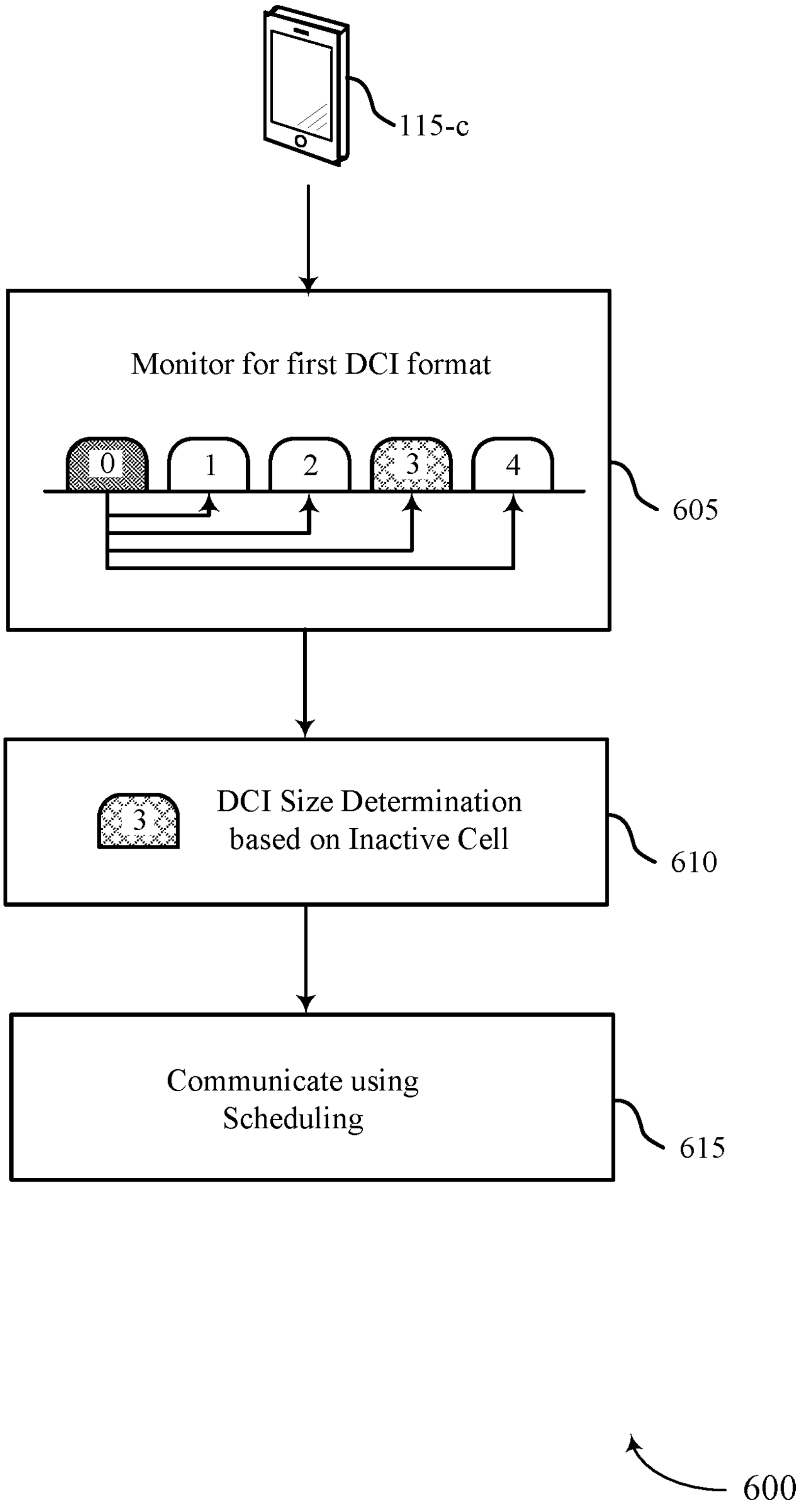

FIG. 6 illustrates an example of a process flow 600 that supports techniques for DCI size alignment and monitoring for inactive cells in accordance with one or more aspects of the present disclosure. The process flow 600 illustrates a DCI size determination procedure performed at a UE 115-*c*, which may be an example of a UE described herein. In the following description of process flow 600, the operations may be performed in a different order than the order shown, or other operations may be added or removed from the process flow 600. For example, some operations may also be left out of process flow 600, may be performed in different orders or at different times, or other operations may be added to process flow 600. Although the UE 115-*c* is shown performing the operations of process flow 600, some aspects of some operations may also be performed by one or more other wireless or network devices.

At 605, the UE 115-*c* may monitor for a first DCI format that schedules a set of cells via a set of fields, where each field of the set of fields indicates a scheduling for one or more cells of the set of cells configured for the first DCI format. In addition, the one or more cells may include at least one inactive cell (e.g., cell 3). In some examples, the set of fields may include at least a first field type that indicates configuration values on a multi-cell basis for the set of cells configured for the first DCI format, and a second field type that indicates configuration values on a per-cell basis for the one or more cells of the set of cells configured for the first DCI format.

At 610, the UE 115-*c* may perform a DCI size determination based on the identification of the at least one inactive cell. In some examples, the UE 115-*c* may monitor a set of control parameters included in a reference BWP configuration to identify a field that corresponds to the inactive cell. The UE 115-*c* may then determine the size of the first DCI format as a total size of the set of fields including the field that corresponds to the inactive cell, where communicating the first DCI format is based on determining the size of the first DCI format. In some other examples, the UE 115-*c* may monitor a set of control parameters included in a reference BWP configuration to identify a field that corresponds to the inactive cell, and may determine the size of the first DCI format as a total size of the set of fields excluding the field that corresponds to the inactive cell.

In some implementations, the UE 115-*c* may monitor a PDCCH for a DCI in a scheduling cell. The DCI field size may depend on an RRC parameter provided in the BWP configuration of a scheduled cell. In some cases, if the scheduled cell is deactivated or dormant, the UE 115-*c* may not monitor PDCCH for the deactivated cell. In examples of multi-cell scheduling, however, the UE 115-*c* may monitor PDCCH for the DCI in the scheduling cell for the cells that are still active (even if some cells are deactivated or dormant). In such examples, there may be one or more DCI fields that rely on the RRC parameters provided in BWP configuration of the scheduled cells. To identify the one or more fields of the DCI format (in cases where some cells are deactivated or dormant), the UE refers to the parameters provided in a reference BWP of the inactive cell.

In some other examples, one cell of the one or more cells is an active cell and the remaining cells are inactive. The UE 115-*c* may then monitor respective control parameters included in respective reference BWP configurations that correspond to the inactive cells to identify respective fields that correspond to the inactive cells. The UE 115-*c* may then determine the size of the first DCI format as a total size of the set of fields including or excluding the respective fields that correspond to the inactive cells.

In some other examples, one cell of the one or more cells is an active cell and remaining cells of the one or more cells are inactive cells, and the UE 115-*c* may refrain from monitoring for the first DCI format based on the remaining cells of the one or more cells being inactive. In addition, in some implementations the UE 115-*c* may monitor for one or more other DCI formats by excluding a quantity of CCEs or blind decoding candidates corresponding to the first DCI format. The UE 115-*c* may receive the one or more other DCI formats via the quantity of CCEs or blind decoding candidates corresponding to the first DCI format.

In some other examples, a reference cell of the one or more cells is inactive and the UE 115-*c* may refrain from monitoring for the first DCI format based on the inactive reference cell, or the UE 115-*c* may monitor for the first DCI format based on including a quantity of CCEs or blind decoding candidates corresponding to the first DCI format. In some other examples, the UE 115-*c* may select a cell that is different from the reference cell to monitor for the first DCI format, and may monitor for the first DCI format on the cell that is different from the reference cell based on including a quantity of CCEs or blind decoding candidates corresponding to the first DCI format. In such examples, the UE 115-*c* may select the cell based on a serving cell index associated with the cell.

At 615, the UE 115-*c* may communicate, via the one or more cells and based on the scheduling, a first DCI format having a size that is based on the size of a field corresponding to the inactive cell.

Figure 7:
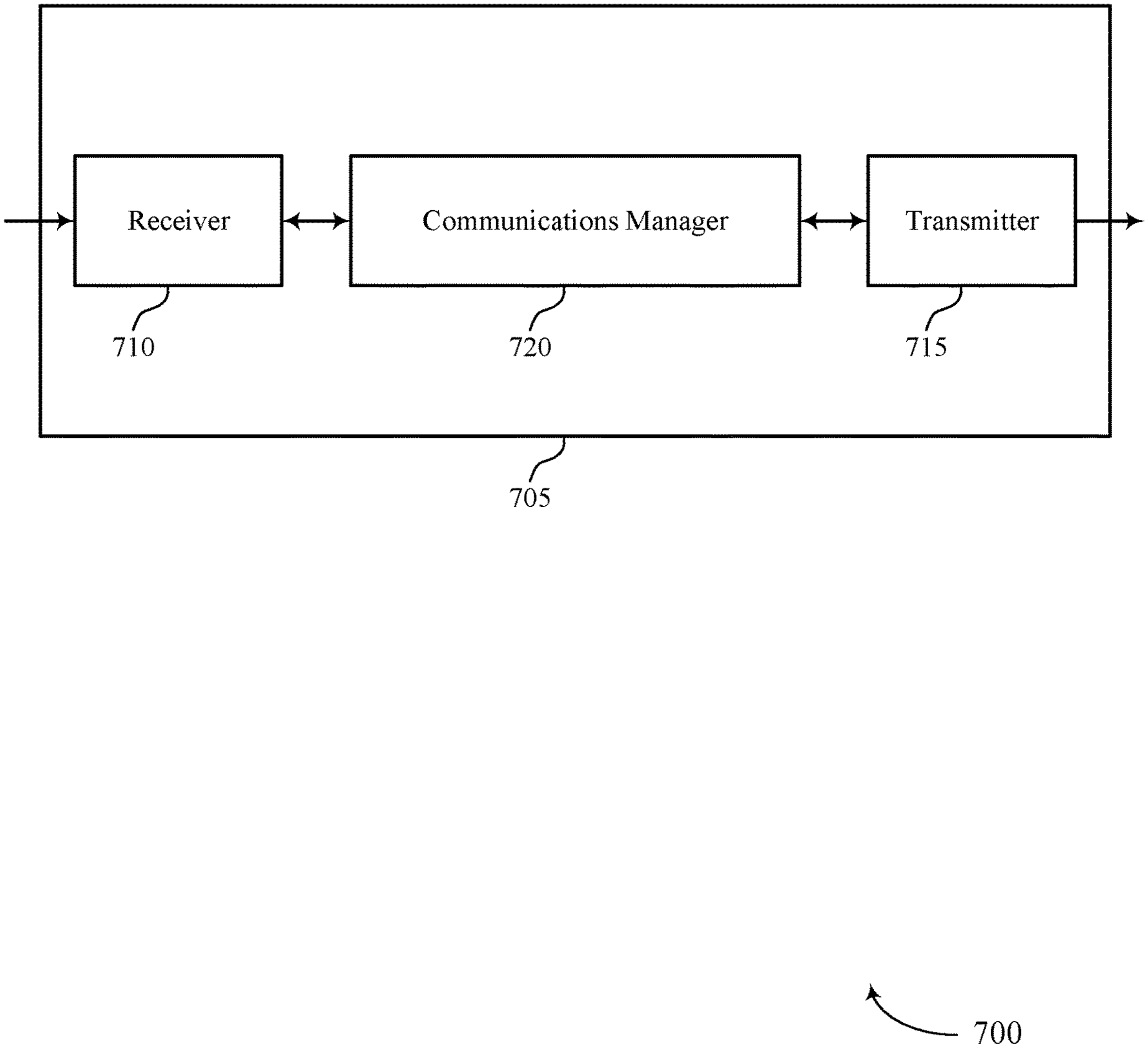
FIGS. 7 and 8 illustrate block diagrams of devices that support techniques for DCI size alignment and monitoring for inactive cells in accordance with one or more aspects of the present disclosure.

FIG. 7 illustrates a block diagram 700 of a device 705 that supports techniques for DCI size alignment and monitoring for inactive cells in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for DCI size alignment and monitoring for inactive cells). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for DCI size alignment and monitoring for inactive cells). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for DCI size alignment and monitoring for inactive cells as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for monitoring for a set of multiple DCI messages including a first set of DCI messages that schedule a single cell and a second set of DCI messages that schedule a set of cells. The communications manager 720 may be configured as or otherwise support a means for performing, based on the monitoring, a first size alignment operation to reduce a quantity of different sizes of the set of multiple DCI messages included in the second set of DCI messages based on the quantity satisfying a threshold. The communications manager 720 may be configured as or otherwise support a means for performing a second size alignment operation to reduce the quantity of different sizes of the set of multiple DCI messages included in the first set of DCI messages based on performing the first size alignment operation.

Additionally, or alternatively, the communications manager 720 may support wireless communication at a UE in accordance with examples as disclosed herein. For example, the communications manager 720 may be configured as or otherwise support a means for monitoring for a first DCI format that schedules a set of cells via a set of multiple fields, each field of the set of multiple fields indicating a scheduling for one or more cells of the set of cells configured for the first DCI format, where the one or more cells include an inactive cell. The communications manager 720 may be configured as or otherwise support a means for communicating, via the one or more cells basing at least in part on the scheduling, a first DCI format having a size that is based on the size of a field corresponding to the inactive cell.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, reduced decoding complexity including blind decoding and polar coding complexity, and increased scheduling efficiency and resource usage.

Figure 8:
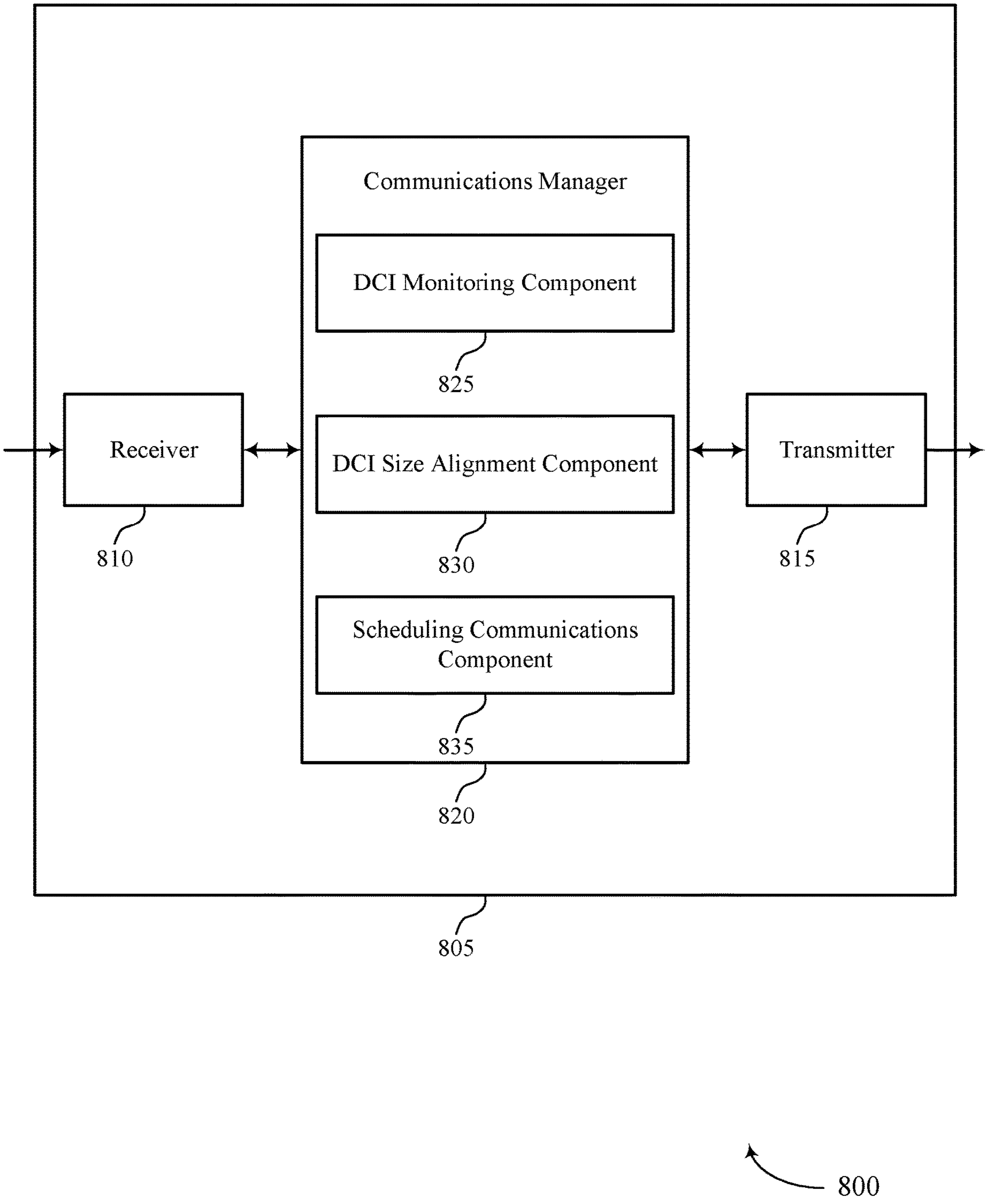

FIG. 8 illustrates a block diagram 800 of a device 805 that supports techniques for DCI size alignment and monitoring for inactive cells in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for DCI size alignment and monitoring for inactive cells). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for DCI size alignment and monitoring for inactive cells). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for DCI size alignment and monitoring for inactive cells as described herein. For example, the communications manager 820 may include a DCI monitoring component 825, a DCI size alignment component 830, a scheduling communications component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The DCI monitoring component 825 may be configured as or otherwise support a means for monitoring for a set of multiple DCI messages including a first set of DCI messages that schedule a single cell and a second set of DCI messages that schedule a set of cells. The DCI size alignment component 830 may be configured as or otherwise support a means for performing, based on the monitoring, a first size alignment operation to reduce a quantity of different sizes of the set of multiple DCI messages included in the second set of DCI messages based on the quantity satisfying a threshold. The DCI size alignment component 830 may be configured as or otherwise support a means for performing a second size alignment operation to reduce the quantity of different sizes of the set of multiple DCI messages included in the first set of DCI messages based on performing the first size alignment operation.

Additionally, or alternatively, the communications manager 820 may support wireless communication at a UE in accordance with examples as disclosed herein. The DCI monitoring component 825 may be configured as or otherwise support a means for monitoring for a first DCI format that schedules a set of cells via a set of multiple fields, each field of the set of multiple fields indicating a scheduling for one or more cells of the set of cells configured for the first DCI format, where the one or more cells include an inactive cell. The scheduling communications component 835 may be configured as or otherwise support a means for communicating, via the one or more cells based on the scheduling, a first DCI format having a size that is based on the size of a field corresponding to the inactive cell.

Figure 9:
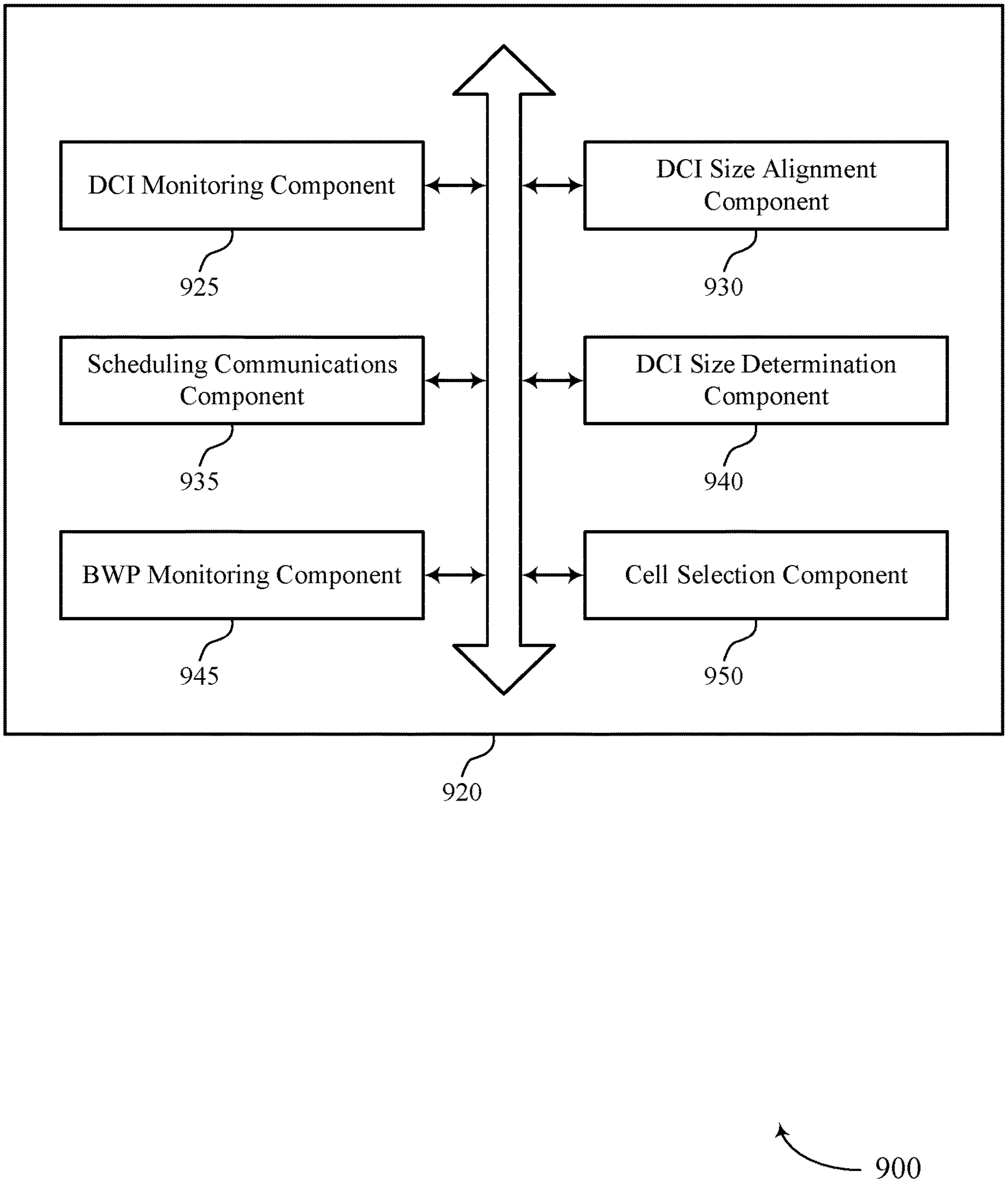
FIG. 9 illustrates a block diagram of a communications manager that supports techniques for DCI size alignment and monitoring for inactive cells in accordance with one or more aspects of the present disclosure.

FIG. 9 illustrates a block diagram 900 of a communications manager 920 that supports techniques for DCI size alignment and monitoring for inactive cells in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for DCI size alignment and monitoring for inactive cells as described herein. For example, the communications manager 920 may include a DCI monitoring component 925, a DCI size alignment component 930, a scheduling communications component 935, a DCI size determination component 940, a BWP monitoring component 945, a cell selection component 950, or any combination thereof. Each of these components may communicate, directly or indirectly, with one another (e.g., via one or more buses).

The communications manager 920 may support wireless communication at a UE in accordance with examples as disclosed herein. The DCI monitoring component 925 may be configured as or otherwise support a means for monitoring for a set of multiple DCI messages including a first set of DCI messages that schedule a single cell and a second set of DCI messages that schedule a set of cells. The DCI size alignment component 930 may be configured as or otherwise support a means for performing, based on the monitoring, a first size alignment operation to reduce a quantity of different sizes of the set of multiple DCI messages included in the second set of DCI messages based on the quantity satisfying a threshold. In some examples, the DCI size alignment component 930 may be configured as or otherwise support a means for performing a second size alignment operation to reduce the quantity of different sizes of the set of multiple DCI messages included in the first set of DCI messages based on performing the first size alignment operation.

In some examples, to support performing the first size alignment operation, the DCI size alignment component 930 may be configured as or otherwise support a means for performing the first size alignment operation on a first size and a second size of the quantity of different sizes of the set of multiple DCI messages included in the second set of DCI messages, the first size alignment operation including padding the first size or the second size with a quantity of filler bits such that the first size and the second size are equal.

In some examples, to support performing the second size alignment operation, the DCI size alignment component 930 may be configured as or otherwise support a means for performing the second size alignment operation on a first size and a second size of the quantity of different sizes of the set of multiple DCI messages included in the first set of DCI messages, the second size alignment operation including padding the first size or the second size with a quantity of filler bits such that the first size and the second size are equal.

In some examples, the DCI size determination component 940 may be configured as or otherwise support a means for determining that the quantity of different sizes of the set of multiple DCI messages satisfies the threshold after performing the first size alignment operation, where performing the second size alignment operation is based on the determination.

In some examples, the DCI size determination component 940 may be configured as or otherwise support a means for determining that the quantity of different sizes of the set of multiple DCI messages satisfies the threshold after performing the first size alignment operation and the second size alignment operation. In some examples, the DCI size determination component 940 may be configured as or otherwise support a means for determining, based on determining that the quantity satisfies the threshold after performing the first size alignment operation and the second size alignment operation, a first size of the quantity of different sizes of the set of multiple DCI messages included in the first set of DCI messages and a second size of the quantity of different sizes of the set of multiple DCI messages included in the second set of DCI messages. In some examples, the DCI size alignment component 930 may be configured as or otherwise support a means for performing a third size alignment operation by padding the first size or the second size with a quantity of filler bits such that the first size and the second size are equal.

In some examples, the first set of DCI messages that schedule the single cell are associated with a first set of CCEs and the second set of DCI messages that schedule the set of cells are associated with a second set of CCEs different from the first set of CCEs.

In some examples, the set of multiple DCI messages included in the second set of DCI messages and in the first set of DCI messages are configured for a same reference cell.

In some examples, DCI messages included in the second set of DCI messages have a larger size than DCI messages included in the first set of DCI messages based on the second set of DCI messages scheduling the set of cells.

In some examples, the threshold includes a total threshold quantity of different sizes of DCI messages, a total threshold quantity of different sizes of DCI messages scrambled with cell-specific radio network temporary identifiers, or both.

Additionally, or alternatively, the communications manager 920 may support wireless communication at a UE in accordance with examples as disclosed herein. In some examples, the DCI monitoring component 925 may be configured as or otherwise support a means for monitoring for a first DCI format that schedules a set of cells via a set of multiple fields, each field of the set of multiple fields indicating a scheduling for one or more cells of the set of cells configured for the first DCI format, where the one or more cells include an inactive cell. The scheduling communications component 935 may be configured as or otherwise support a means for communicating, via the one or more cells based on the scheduling, a first DCI format having a size that is based on the size of a field corresponding to the inactive cell.

In some examples, the BWP monitoring component 945 may be configured as or otherwise support a means for monitoring a set of control parameters included in a reference BWP configuration to identify a field of the set of multiple fields that corresponds to the inactive cell. In some examples, the DCI size determination component 940 may be configured as or otherwise support a means for determining the size of the first DCI format as a total size of the set of multiple fields including the field that corresponds to the inactive cell, where communicating the first DCI format is based on determining the size of the first DCI format.

In some examples, the BWP monitoring component 945 may be configured as or otherwise support a means for monitoring a set of control parameters included in a reference BWP configuration to identify a field of the set of multiple fields that corresponds to the inactive cell. In some examples, the DCI size determination component 940 may be configured as or otherwise support a means for determining the size of the first DCI format as a total size of the set of multiple fields excluding the field that corresponds to the inactive cell, where communicating the first DCI format is based on determining the size of the first DCI format.

In some examples, one cell of the one or more cells is an active cell and remaining cells of the one or more cells are inactive cells, and the BWP monitoring component 945 may be configured as or otherwise support a means for monitoring respective control parameters included in respective reference BWP configurations that correspond to the inactive cells to identify respective fields of the set of multiple fields that correspond to the inactive cells. In some examples, one cell of the one or more cells is an active cell and remaining cells of the one or more cells are inactive cells, and the DCI size determination component 940 may be configured as or otherwise support a means for determining the size of the first DCI format as a total size of the set of multiple fields including or excluding the respective fields that correspond to the inactive cells, where communicating the first DCI format is based on determining the size of the first DCI format.

In some examples, one cell of the one or more cells is an active cell and remaining cells of the one or more cells are inactive cells, and the DCI monitoring component 925 may be configured as or otherwise support a means for refraining from monitoring for the first DCI format based on the remaining cells of the one or more cells being inactive.

In some examples, one cell of the one or more cells is an active cell and remaining cells of the one or more cells are inactive cells, and the DCI monitoring component 925 may be configured as or otherwise support a means for refraining from monitoring for the first DCI format based on the remaining cells of the one or more cells being inactive. In some examples, one cell of the one or more cells is an active cell and remaining cells of the one or more cells are inactive cells, and the DCI monitoring component 925 may be configured as or otherwise support a means for monitoring for one or more DCI formats by excluding a quantity of CCEs or blind decoding candidates corresponding to the first DCI format.

In some examples, the DCI monitoring component 925 may be configured as or otherwise support a means for receiving the one or more DCI formats via the quantity of CCEs or blind decoding candidates corresponding to the first DCI format.

In some examples, a reference cell of the one or more cells is inactive, and the DCI monitoring component 925 may be configured as or otherwise support a means for refraining from monitoring for the first DCI format based on the reference cell being inactive.

In some examples, a reference cell of the one or more cells is inactive, and the DCI monitoring component 925 may be configured as or otherwise support a means for monitoring for the first DCI format based on including a quantity of CCEs or blind decoding candidates corresponding to the first DCI format.

In some examples, a reference cell of the one or more cells is inactive, and the cell selection component 950 may be configured as or otherwise support a means for selecting a cell that is different from the reference cell to monitor for the first DCI format. In some examples, a reference cell of the one or more cells is inactive, and the DCI monitoring component 925 may be configured as or otherwise support a means for monitoring for the first DCI format on the cell that is different from the reference cell based on including a quantity of CCEs or blind decoding candidates corresponding to the first DCI format.

In some examples, the selecting is based on a serving cell index associated with the cell.

In some examples, the set of multiple fields include at least a first field type that indicates configuration values on a multi-cell basis for the set of cells configured for the first DCI format, and a second field type that indicates configuration values on a per-cell basis for the one or more cells of the set of cells configured for the first DCI format.

Figure 10:
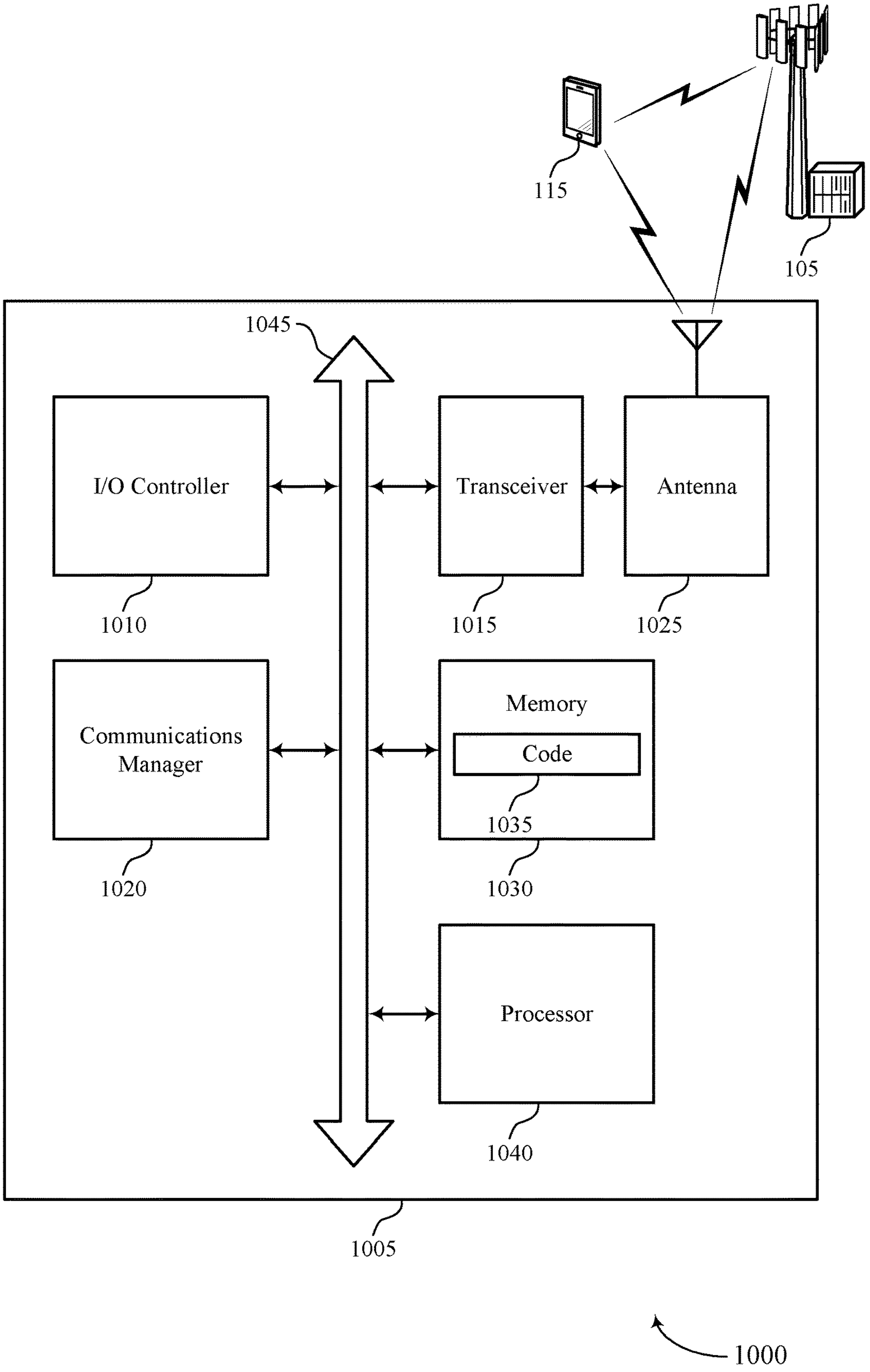
FIG. 10 illustrates a diagram of a system including a device that supports techniques for DCI size alignment and monitoring for inactive cells in accordance with one or more aspects of the present disclosure.

FIG. 10 illustrates a diagram of a system 1000 including a device 1005 that supports techniques for DCI size alignment and monitoring for inactive cells in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for DCI size alignment and monitoring for inactive cells). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for monitoring for a set of multiple DCI messages including a first set of DCI messages that schedule a single cell and a second set of DCI messages that schedule a set of cells. The communications manager 1020 may be configured as or otherwise support a means for performing, based on the monitoring, a first size alignment operation to reduce a quantity of different sizes of the set of multiple DCI messages included in the second set of DCI messages based on the quantity satisfying a threshold. The communications manager 1020 may be configured as or otherwise support a means for performing a second size alignment operation to reduce the quantity of different sizes of the set of multiple DCI messages included in the first set of DCI messages based on performing the first size alignment operation.

Additionally, or alternatively, the communications manager 1020 may support wireless communication at a UE in accordance with examples as disclosed herein. For example, the communications manager 1020 may be configured as or otherwise support a means for monitoring for a first DCI format that schedules a set of cells via a set of multiple fields, each field of the set of multiple fields indicating a scheduling for one or more cells of the set of cells configured for the first DCI format, where the one or more cells include an inactive cell. The communications manager 1020 may be configured as or otherwise support a means for communicating, via the one or more cells basing at least in part on the scheduling, a first DCI format having a size that is based on the size of a field corresponding to the inactive cell.

By including or configuring the communications manager 1020 in accordance with examples as described herein, the device 1005 may support techniques for reduced latency, improved user experience related to reduced processing, reduced processing, reduced power consumption, reduced decoding complexity including blind decoding and polar coding complexity, and increased scheduling efficiency and resource usage efficiency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for DCI size alignment and monitoring for inactive cells as described herein, or the processor 1040 and the memory 1030 may be otherwise configured to perform or support such operations.

Figure 11:
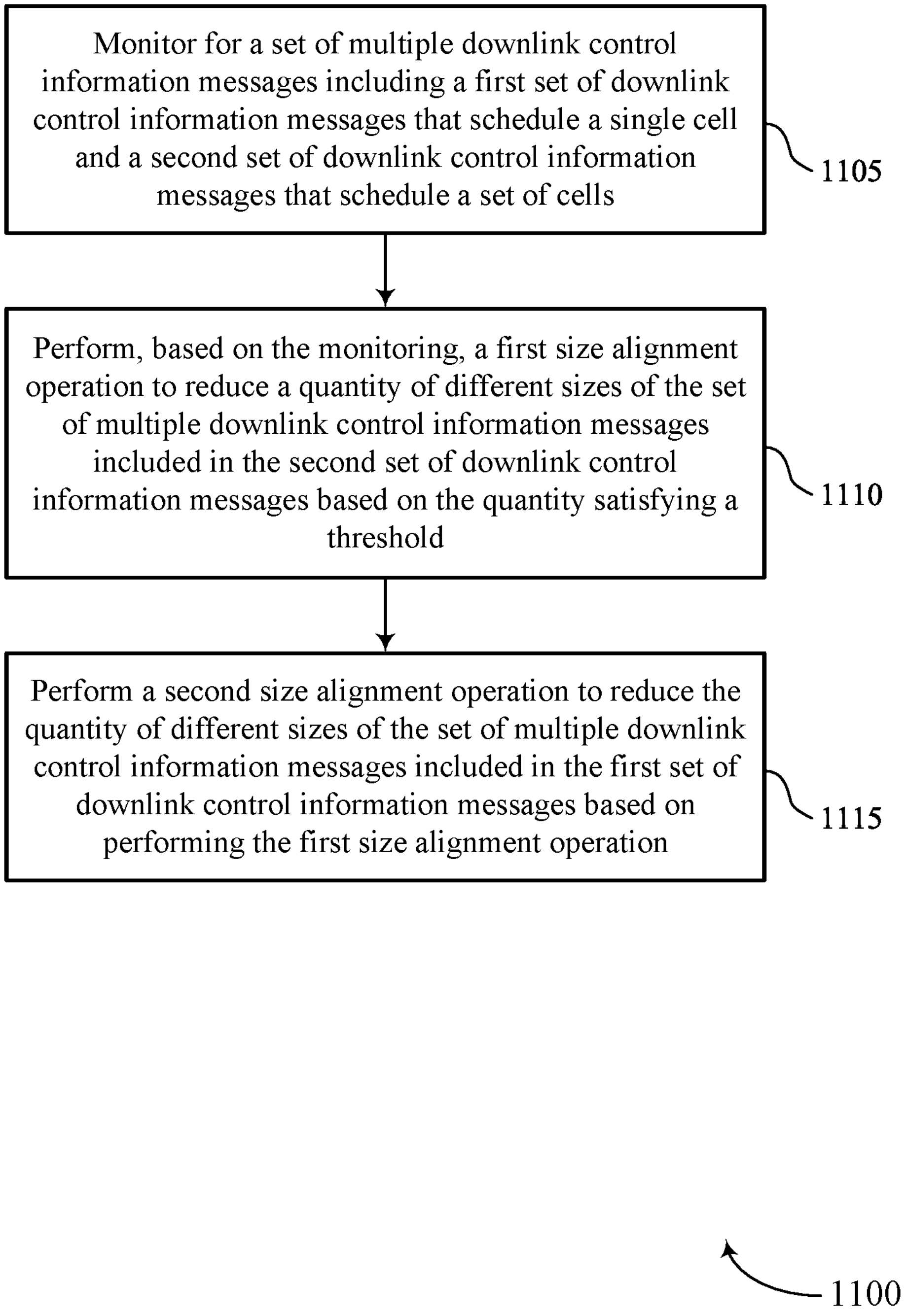
FIGS. 11 through 14 illustrate flowcharts showing methods that support techniques for DCI size alignment and monitoring for inactive cells in accordance with one or more aspects of the present disclosure.

FIG. 11 illustrates a flowchart showing a method 1100 that supports techniques for DCI size alignment and monitoring for inactive cells in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include monitoring for a set of multiple DCI messages including a first set of DCI messages that schedule a single cell and a second set of DCI messages that schedule a set of cells. The operations of 1105 may be performed in accordance with examples as disclosed herein. In some examples, aspects of the operations of 1105 may be performed by a DCI monitoring component 925 as described with reference to FIG. 9.

At 1110, the method may include performing, based on the monitoring, a first size alignment operation to reduce a quantity of different sizes of the set of multiple DCI messages included in the second set of DCI messages based on the quantity satisfying a threshold. The operations of 1110 may be performed in accordance with examples as disclosed herein. In some examples, aspects of the operations of 1110 may be performed by a DCI size alignment component 930 as described with reference to FIG. 9.

At 1115, the method may include performing a second size alignment operation to reduce the quantity of different sizes of the set of multiple DCI messages included in the first set of DCI messages based on performing the first size alignment operation. The operations of 1115 may be performed in accordance with examples as disclosed herein. In some examples, aspects of the operations of 1115 may be performed by a DCI size alignment component 930 as described with reference to FIG. 9.

Figure 12:
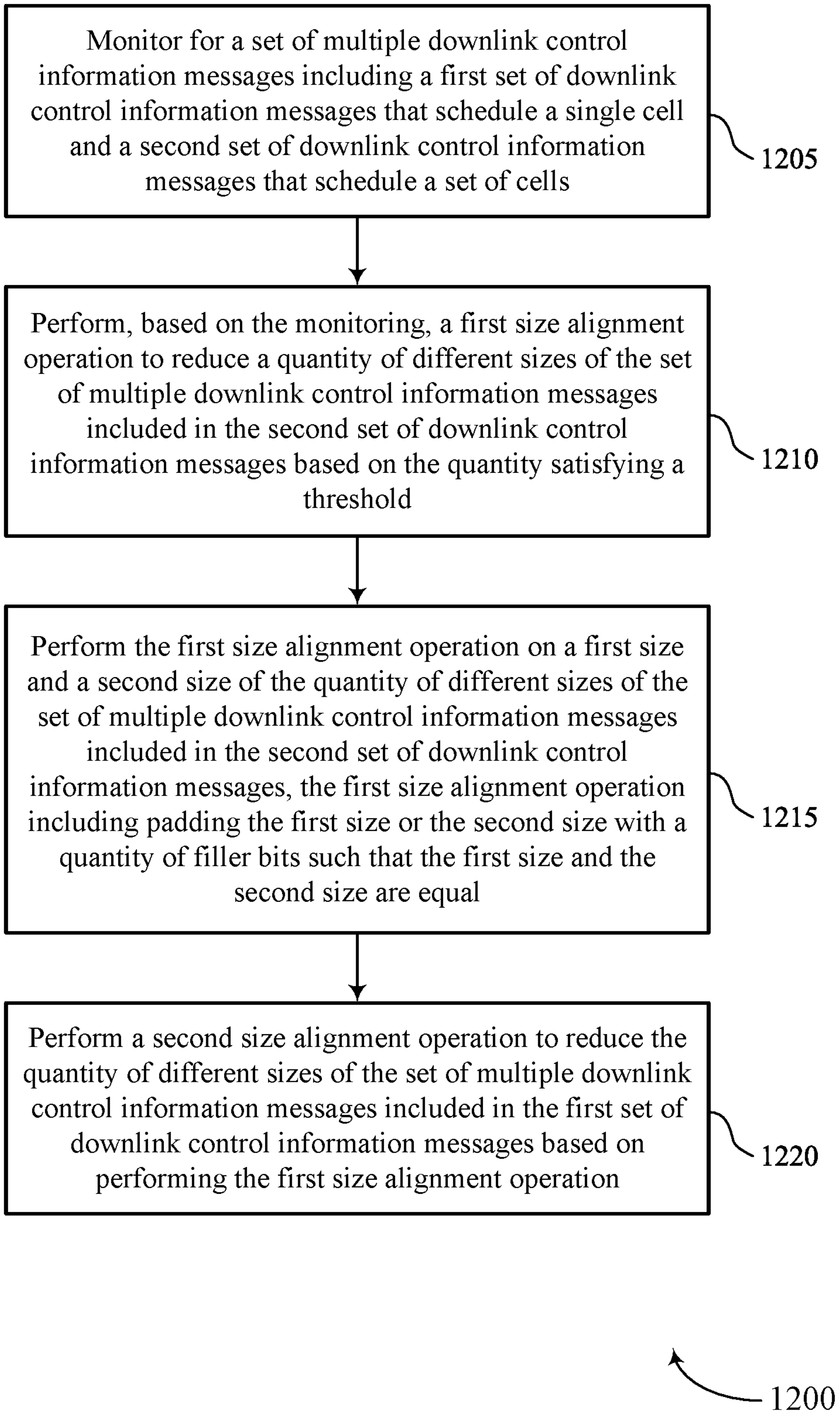

FIG. 12 illustrates a flowchart showing a method 1200 that supports techniques for DCI size alignment and monitoring for inactive cells in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include monitoring for a set of multiple DCI messages including a first set of DCI messages that schedule a single cell and a second set of DCI messages that schedule a set of cells. The operations of 1205 may be performed in accordance with examples as disclosed herein. In some examples, aspects of the operations of 1205 may be performed by a DCI monitoring component 925 as described with reference to FIG. 9.

At 1210, the method may include performing, based on the monitoring, a first size alignment operation to reduce a quantity of different sizes of the set of multiple DCI messages included in the second set of DCI messages based on the quantity satisfying a threshold. The operations of 1210 may be performed in accordance with examples as disclosed herein. In some examples, aspects of the operations of 1210 may be performed by a DCI size alignment component 930 as described with reference to FIG. 9.

At 1215, the method may include performing the first size alignment operation on a first size and a second size of the quantity of different sizes of the set of multiple DCI messages included in the second set of DCI messages, the first size alignment operation including padding the first size or the second size with a quantity of filler bits such that the first size and the second size are equal. The operations of 1215 may be performed in accordance with examples as disclosed herein. In some examples, aspects of the operations of 1215 may be performed by a DCI size alignment component 930 as described with reference to FIG. 9.

At 1220, the method may include performing a second size alignment operation to reduce the quantity of different sizes of the set of multiple DCI messages included in the first set of DCI messages based on performing the first size alignment operation. The operations of 1220 may be performed in accordance with examples as disclosed herein. In some examples, aspects of the operations of 1220 may be performed by a DCI size alignment component 930 as described with reference to FIG. 9.

Figure 13:
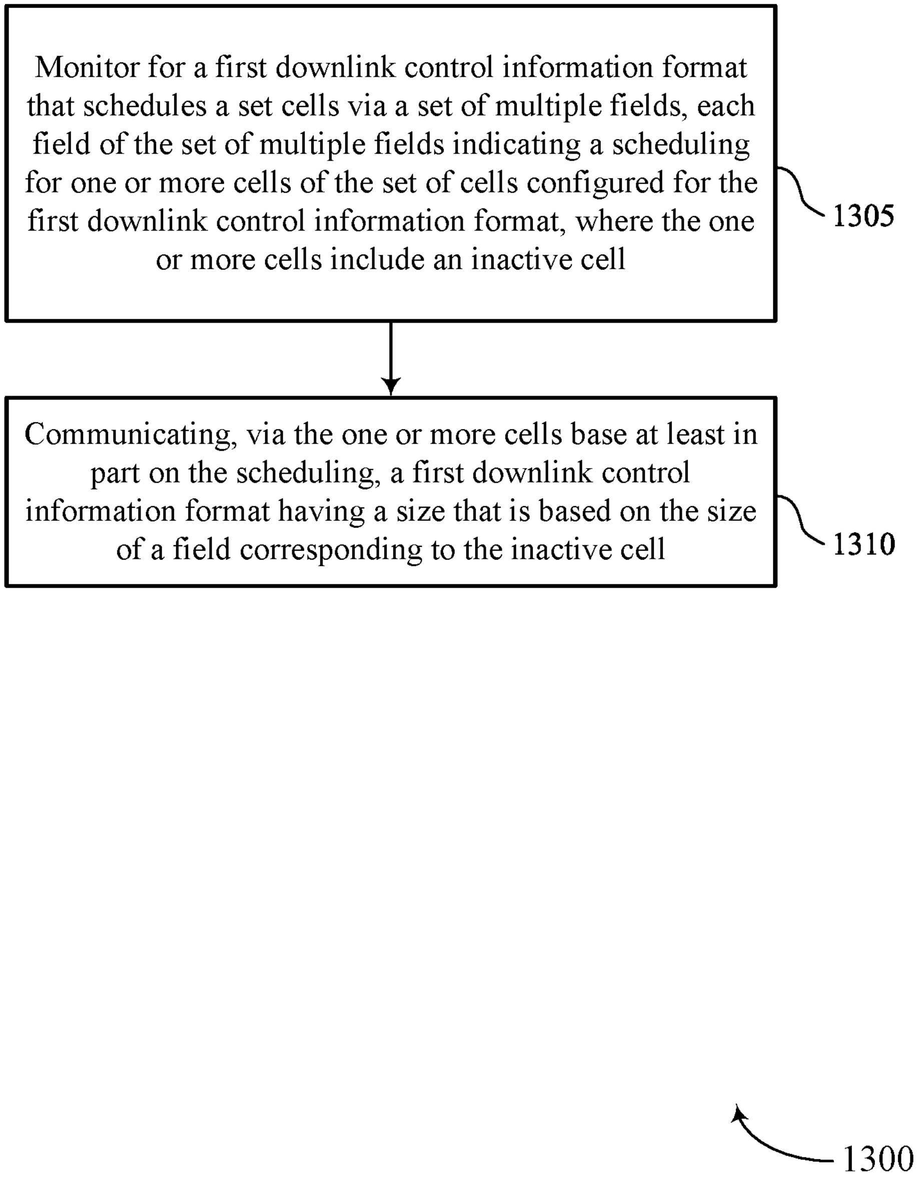

FIG. 13 illustrates a flowchart showing a method 1300 that supports techniques for DCI size alignment and monitoring for inactive cells in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include monitoring for a first DCI format that schedules a set of cells via a set of multiple fields, each field of the set of multiple fields indicating a scheduling for one or more cells of the set of cells configured for the first DCI format, where the one or more cells include an inactive cell. The operations of 1305 may be performed in accordance with examples as disclosed herein. In some examples, aspects of the operations of 1305 may be performed by a DCI monitoring component 925 as described with reference to FIG. 9.

At 1310, the method may include communicating, via the one or more cells based on the scheduling, a first DCI format having a size that is based on the size of a field corresponding to the inactive cell. The operations of 1310 may be performed in accordance with examples as disclosed herein. In some examples, aspects of the operations of 1310 may be performed by a scheduling communications component 935 as described with reference to FIG. 9.

Figure 14:
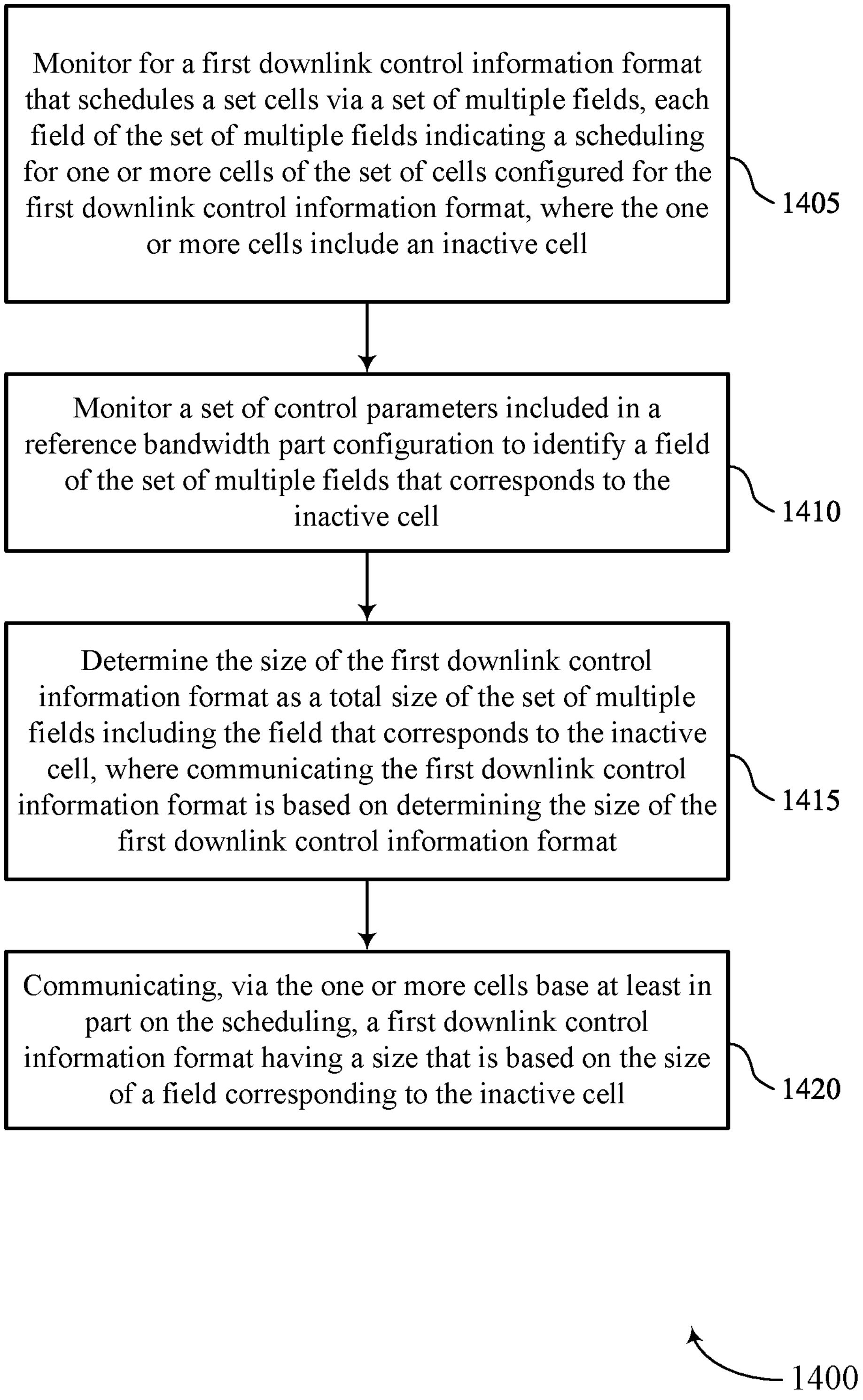

FIG. 14 illustrates a flowchart showing a method 1400 that supports techniques for DCI size alignment and monitoring for inactive cells in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include monitoring for a first DCI format that schedules a set of cells via a set of multiple fields, each field of the set of multiple fields indicating a scheduling for one or more cells of the set of cells configured for the first DCI format, where the one or more cells include an inactive cell. The operations of 1405 may be performed in accordance with examples as disclosed herein. In some examples, aspects of the operations of 1405 may be performed by a DCI monitoring component 925 as described with reference to FIG. 9.

At 1410, the method may include monitoring a set of control parameters included in a reference BWP configuration to identify a field of the set of multiple fields that corresponds to the inactive cell. The operations of 1410 may be performed in accordance with examples as disclosed herein. In some examples, aspects of the operations of 1410 may be performed by a BWP monitoring component 945 as described with reference to FIG. 9.

At 1415, the method may include determining the size of the first DCI format as a total size of the set of multiple fields including the field that corresponds to the inactive cell, where communicating the first DCI format is based on determining the size of the first DCI format. The operations of 1415 may be performed in accordance with examples as disclosed herein. In some examples, aspects of the operations of 1415 may be performed by a DCI size determination component 940 as described with reference to FIG. 9.

At 1420, the method may include communicating, via the one or more cells based on the scheduling, a first DCI format having a size that is based on the size of a field corresponding to the inactive cell. The operations of 1420 may be performed in accordance with examples as disclosed herein. In some examples, aspects of the operations of 1420 may be performed by a scheduling communications component 935 as described with reference to FIG. 9.

The following provides an overview of aspects of the present disclosure:

Aspect 1: A method for wireless communication at a UE, comprising: monitoring for a plurality of DCI messages comprising a first set of DCI messages that schedule a single cell and a second set of DCI messages that schedule a set of cells; performing, based at least in part on the monitoring, a first size alignment operation to reduce a quantity of different sizes of the plurality of DCI messages included in the second set of DCI messages based at least in part on the quantity satisfying a threshold; and performing a second size alignment operation to reduce the quantity of different sizes of the plurality of DCI messages included in the first set of DCI messages based at least in part on performing the first size alignment operation.

Aspect 2: The method of aspect 1, wherein performing the first size alignment operation further comprises: performing the first size alignment operation on a first size and a second size of the quantity of different sizes of the plurality of DCI messages included in the second set of DCI messages, the first size alignment operation comprising padding the first size or the second size with a quantity of filler bits such that the first size and the second size are equal.

Aspect 3: The method of any of aspects 1 through 2, wherein performing the second size alignment operation further comprises: performing the second size alignment operation on a first size and a second size of the quantity of different sizes of the plurality of DCI messages included in the first set of DCI messages, the second size alignment operation comprising padding the first size or the second size with a quantity of filler bits such that the first size and the second size are equal.

Aspect 4: The method of aspect 3, further comprising: determining that the quantity of different sizes of the plurality of DCI messages satisfies the threshold after performing the first size alignment operation, wherein performing the second size alignment operation is based at least in part on the determination.

Aspect 5: The method of any of aspects 1 through 4, further comprising: determining that the quantity of different sizes of the plurality of DCI messages satisfies the threshold after performing the first size alignment operation and the second size alignment operation; determining, based at least in part on determining that the quantity satisfies the threshold after performing the first size alignment operation and the second size alignment operation, a first size of the quantity of different sizes of the plurality of DCI messages included in the first set of DCI messages and a second size of the quantity of different sizes of the plurality of DCI messages included in the second set of DCI messages; and performing a third size alignment operation by padding the first size or the second size with a quantity of filler bits such that the first size and the second size are equal.

Aspect 6: The method of any of aspects 1 through 5, wherein the first set of DCI messages that schedule the single cell are associated with a first set of CCEs and the second set of DCI messages that schedule the set of cells are associated with a second set of CCEs different from the first set of CCEs.

Aspect 7: The method of any of aspects 1 through 6, wherein the plurality of DCI messages included in the second set of DCI messages and in the first set of DCI messages are configured for a same reference cell.

Aspect 8: The method of any of aspects 1 through 7, wherein DCI messages included in the second set of DCI messages have a larger size than DCI messages included in the first set of DCI messages based at least in part on the second set of DCI messages scheduling the set of cells.

Aspect 9: The method of any of aspects 1 through 8, wherein the threshold comprises a total threshold quantity of different sizes of DCI messages, a total threshold quantity of different sizes of DCI messages scrambled with cell-specific radio network temporary identifiers, or both.

Aspect 10: A method for wireless communication at a UE, comprising: monitoring for a first DCI format that schedules a set cells via a plurality of fields, each field of the plurality of fields indicating a scheduling for one or more cells of the set of cells configured for the first DCI format, wherein the one or more cells comprise an inactive cell; and communicating, via the one or more cells based at least in part on the scheduling, a first DCI format having a size that is based at least in part on the size of a field corresponding to the inactive cell.

Aspect 11: The method of aspect 10, further comprising: monitoring a set of control parameters included in a reference BWP configuration to identify a field of the plurality of fields that corresponds to the inactive cell; and determining the size of the first DCI format as a total size of the plurality of fields including the field that corresponds to the inactive cell, wherein communicating the first DCI format is based at least in part on determining the size of the first DCI format.

Aspect 12: The method of any of aspects 10 through 11, further comprising: monitoring a set of control parameters included in a reference BWP configuration to identify a field of the plurality of fields that corresponds to the inactive cell; and determining the size of the first DCI format as a total size of the plurality of fields excluding the field that corresponds to the inactive cell, wherein communicating the first DCI format is based at least in part on determining the size of the first DCI format.

Aspect 13: The method of any of aspects 10 through 12, wherein one cell of the one or more cells is an active cell and remaining cells of the one or more cells are inactive cells, the method further comprising: monitoring respective control parameters included in respective reference BWP configurations that correspond to the inactive cells to identify respective fields of the plurality of fields that correspond to the inactive cells; and determining the size of the first DCI format as a total size of the plurality of fields including or excluding the respective fields that correspond to the inactive cells, wherein communicating the first DCI format is based at least in part on determining the size of the first DCI format.

Aspect 14: The method of any of aspects 10 through 13, wherein one cell of the one or more cells is an active cell and remaining cells of the one or more cells are inactive cells, the method further comprising: refraining from monitoring for the first DCI format based at least in part on the remaining cells of the one or more cells being inactive.

Aspect 15: The method of any of aspects 10 through 14, wherein one cell of the one or more cells is an active cell and remaining cells of the one or more cells are inactive cells, and the method further comprises: refraining from monitoring for the first DCI format based at least in part on the remaining cells of the one or more cells being inactive; and monitoring for one or more DCI formats by excluding a quantity of CCEs or blind decoding candidates corresponding to the first DCI format.

Aspect 16: The method of aspect 15, further comprising: receiving the one or more DCI formats via the quantity of CCEs or blind decoding candidates corresponding to the first DCI format.

Aspect 17: The method of any of aspects 10 through 16, wherein a reference cell of the one or more cells is inactive, the method further comprising: refraining from monitoring for the first DCI format based at least in part on the reference cell being inactive.

Aspect 18: The method of any of aspects 10 through 17, wherein a reference cell of the one or more cells is inactive, the method further comprising: monitoring for the first DCI format based at least in part on including a quantity of CCEs or blind decoding candidates corresponding to the first DCI format.

Aspect 19: The method of any of aspects 10 through 18, wherein a reference cell of the one or more cells is inactive, the method further comprising: selecting a cell that is different from the reference cell to monitor for the first DCI format; and monitoring for the first DCI format on the cell that is different from the reference cell based at least in part on including a quantity of CCEs or blind decoding candidates corresponding to the first DCI format.

Aspect 20: The method of aspect 19, wherein the selecting is based at least in part on a serving cell index associated with the cell.

Aspect 21: The method of any of aspects 10 through 20, wherein the plurality of fields comprise at least a first field type that indicates configuration values on a multi-cell basis for the set of cells configured for the first DCI format, and a second field type that indicates configuration values on a per-cell basis for the one or more cells of the set of cells configured for the first DCI format.

Aspect 22: An apparatus for wireless communication at a UE, comprising a processor; memory coupled with the processor; and instructions stored in the memory and executable by the processor to cause the apparatus to perform a method of any of aspects 1 through 9.

Aspect 23: An apparatus for wireless communication at a UE, comprising at least one means for performing a method of any of aspects 1 through 9.

Aspect 24: A non-transitory computer-readable medium storing code for wireless communication at a UE, the code comprising instructions executable by a processor to perform a method of any of aspects 1 through 9.

Aspect 25: An apparatus for wireless communication at a UE, comprising a processor; memory coupled with the processor; and instructions stored in the memory and executable by the processor to cause the apparatus to perform a method of any of aspects 10 through 21.

Aspect 26: An apparatus for wireless communication at a UE, comprising at least one means for performing a method of any of aspects 10 through 21.

Aspect 27: A non-transitory computer-readable medium storing code for wireless communication at a UE, the code comprising instructions executable by a processor to perform a method of any of aspects 10 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and operable to execute the code to cause the UE to:

monitor for a plurality of downlink control information messages comprising a first set of downlink control information messages that schedule a single cell and a second set of downlink control information messages that schedule a set of cells;

perform, based at least in part on the monitoring, a first size alignment operation to reduce a quantity of different sizes of the plurality of downlink control information messages included in the second set of downlink control information messages based at least in part on the quantity satisfying a threshold; and perform a second size alignment operation to reduce the quantity of different sizes of the plurality of downlink control information messages included in the first set of downlink control information messages based at least in part on performing the first size alignment operation.

2. The UE of claim 1, wherein, to perform the first size alignment operation, the one or more processors are operable to execute the code to cause the UE to:

perform the first size alignment operation on a first size and a second size of the quantity of different sizes of the plurality of downlink control information messages included in the second set of downlink control information messages, the first size alignment operation comprising padding the first size or the second size with a quantity of filler bits such that the first size and the second size are equal.

3. The UE of claim 1, wherein, to perform the second size alignment operation, the one or more processors are operable to execute the code to cause the UE to:

perform the second size alignment operation on a first size and a second size of the quantity of different sizes of the plurality of downlink control information messages included in the first set of downlink control information messages, the second size alignment operation comprising padding the first size or the second size with a quantity of filler bits such that the first size and the second size are equal.

4. The UE of claim 3, wherein the one or more processors are operable to execute the code to cause the UE to:

determine that the quantity of different sizes of the plurality of downlink control information messages satisfies the threshold after performing the first size alignment operation, wherein performing the second size alignment operation is based at least in part on the determination.

5. The UE of claim 1, wherein the one or more processors are operable to execute the code to cause the UE to:

determine that the quantity of different sizes of the plurality of downlink control information messages satisfies the threshold after performing the first size alignment operation and the second size alignment operation;

determine, based at least in part on determining that the quantity satisfies the threshold after performing the first size alignment operation and the second size alignment operation, a first size of the quantity of different sizes of the plurality of downlink control information messages included in the first set of downlink control information messages and a second size of the quantity of different sizes of the plurality of downlink control information messages included in the second set of downlink control information messages; and perform a third size alignment operation by padding the first size or the second size with a quantity of filler bits such that the first size and the second size are equal.

6. The UE of claim 1, wherein the first set of downlink control information messages that schedule the single cell are associated with a first set of control channel elements and the second set of downlink control information messages that schedule the set of cells are associated with a second set of control channel elements different from the first set of control channel elements.

7. The UE of claim 1, wherein the plurality of downlink control information messages included in the second set of downlink control information messages and in the first set of downlink control information messages are configured for a same reference cell.

8. The UE of claim 1, wherein downlink control information messages included in the second set of downlink control information messages have a larger size than downlink control information messages included in the first set of downlink control information messages based at least in part on the second set of downlink control information messages scheduling the set of cells.

9. The UE of claim 1, wherein the threshold comprises a total threshold quantity of different sizes of downlink control information messages, a total threshold quantity of different sizes of downlink control information messages scrambled with cell-specific radio network temporary identifiers, or both.

10. A method for wireless communication at a user equipment (UE), comprising:

monitoring for a plurality of downlink control information messages comprising a first set of downlink control information messages that schedule a single cell and a second set of downlink control information messages that schedule a set of cells;

performing, based at least in part on the monitoring, a first size alignment operation to reduce a quantity of different sizes of the plurality of downlink control information messages included in the second set of downlink control information messages based at least in part on the quantity satisfying a threshold; and performing a second size alignment operation to reduce the quantity of different sizes of the plurality of downlink control information messages included in the first set of downlink control information messages based at least in part on performing the first size alignment operation.

11. The method of claim 10, wherein performing the first size alignment operation further comprises:

performing the first size alignment operation on a first size and a second size of the quantity of different sizes of the plurality of downlink control information messages included in the second set of downlink control information messages, the first size alignment operation comprising padding the first size or the second size with a quantity of filler bits such that the first size and the second size are equal.

12. The method of claim 10, wherein performing the second size alignment operation further comprises:

performing the second size alignment operation on a first size and a second size of the quantity of different sizes of the plurality of downlink control information messages included in the first set of downlink control information messages, the second size alignment operation comprising padding the first size or the second size with a quantity of filler bits such that the first size and the second size are equal.

13. The method of claim 12, further comprising:

determining that the quantity of different sizes of the plurality of downlink control information messages satisfies the threshold after performing the first size alignment operation, wherein performing the second size alignment operation is based at least in part on the determination.

14. The method of claim 10, further comprising:

determining that the quantity of different sizes of the plurality of downlink control information messages satisfies the threshold after performing the first size alignment operation and the second size alignment operation;

determining, based at least in part on determining that the quantity satisfies the threshold after performing the first size alignment operation and the second size alignment operation, a first size of the quantity of different sizes of the plurality of downlink control information messages included in the first set of downlink control information messages and a second size of the quantity of different sizes of the plurality of downlink control information messages included in the second set of downlink control information messages; and performing a third size alignment operation by padding the first size or the second size with a quantity of filler bits such that the first size and the second size are equal.

15. The method of claim 10, wherein the first set of downlink control information messages that schedule the single cell are associated with a first set of control channel elements and the second set of downlink control information messages that schedule the set of cells are associated with a second set of control channel elements different from the first set of control channel elements.

16. The method of claim 10, wherein the plurality of downlink control information messages included in the second set of downlink control information messages and in the first set of downlink control information messages are configured for a same reference cell.

17. The method of claim 10, wherein downlink control information messages included in the second set of downlink control information messages have a larger size than downlink control information messages included in the first set of downlink control information messages based at least in part on the second set of downlink control information messages scheduling the set of cells.

18. The method of claim 10, wherein the threshold comprises a total threshold quantity of different sizes of downlink control information messages, a total threshold quantity of different sizes of downlink control information messages scrambled with cell-specific radio network temporary identifiers, or both.

19. A user equipment (UE) for wireless communication, comprising:

means for monitoring for a plurality of downlink control information messages comprising a first set of downlink control information messages that schedule a single cell and a second set of downlink control information messages that schedule a set of cells;

means for performing, based at least in part on the monitoring, a first size alignment operation to reduce a quantity of different sizes of the plurality of downlink control information messages included in the second set of downlink control information messages based at least in part on the quantity satisfying a threshold; and means for performing a second size alignment operation to reduce the quantity of different sizes of the plurality of downlink control information messages included in the first set of downlink control information messages based at least in part on performing the first size alignment operation.

20. The UE of claim 19, wherein the means for performing the first size alignment operation further comprise:

means for performing the first size alignment operation on a first size and a second size of the quantity of different sizes of the plurality of downlink control information messages included in the second set of downlink control information messages, the first size alignment operation comprising padding the first size or the second size with a quantity of filler bits such that the first size and the second size are equal.

21. The UE of claim 19, wherein the means for performing the second size alignment operation further comprise:

means for performing the second size alignment operation on a first size and a second size of the quantity of different sizes of the plurality of downlink control information messages included in the first set of downlink control information messages, the second size alignment operation comprising padding the first size or the second size with a quantity of filler bits such that the first size and the second size are equal.

22. The UE of claim 21, further comprising:

means for determining that the quantity of different sizes of the plurality of downlink control information messages satisfies the threshold after performing the first size alignment operation, wherein performing the second size alignment operation is based at least in part on the determination.

23. The UE of claim 19, further comprising:

means for determining that the quantity of different sizes of the plurality of downlink control information messages satisfies the threshold after performing the first size alignment operation and the second size alignment operation;

means for determining, based at least in part on determining that the quantity satisfies the threshold after performing the first size alignment operation and the second size alignment operation, a first size of the quantity of different sizes of the plurality of downlink control information messages included in the first set of downlink control information messages and a second size of the quantity of different sizes of the plurality of downlink control information messages included in the second set of downlink control information messages; and means for performing a third size alignment operation by padding the first size or the second size with a quantity of filler bits such that the first size and the second size are equal.

24. The UE of claim 19, wherein the first set of downlink control information messages that schedule the single cell are associated with a first set of control channel elements and the second set of downlink control information messages that schedule the set of cells are associated with a second set of control channel elements different from the first set of control channel elements.

25. A non-transitory computer-readable medium storing code for wireless communication, the code comprising instructions executable by one or more processors to:

monitor for a plurality of downlink control information messages comprising a first set of downlink control information messages that schedule a single cell and a second set of downlink control information messages that schedule a set of cells;

perform, based at least in part on the monitoring, a first size alignment operation to reduce a quantity of different sizes of the plurality of downlink control information messages included in the second set of downlink control information messages based at least in part on the quantity satisfying a threshold; and perform a second size alignment operation to reduce the quantity of different sizes of the plurality of downlink control information messages included in the first set of downlink control information messages based at least in part on performing the first size alignment operation.

26. The non-transitory computer-readable medium of claim 25, wherein the instructions to perform the first size alignment operation are further executable by the one or more processors to:

perform the first size alignment operation on a first size and a second size of the quantity of different sizes of the plurality of downlink control information messages included in the second set of downlink control information messages, the first size alignment operation comprising padding the first size or the second size with a quantity of filler bits such that the first size and the second size are equal.

27. The non-transitory computer-readable medium of claim 25, wherein the instructions to perform the second size alignment operation are further executable by the one or more processors to:

perform the second size alignment operation on a first size and a second size of the quantity of different sizes of the plurality of downlink control information messages included in the first set of downlink control information messages, the second size alignment operation comprising padding the first size or the second size with a quantity of filler bits such that the first size and the second size are equal.

28. The non-transitory computer-readable medium of claim 27, wherein the instructions are further executable by the one or more processors to:

determine that the quantity of different sizes of the plurality of downlink control information messages satisfies the threshold after performing the first size alignment operation, wherein performing the second size alignment operation is based at least in part on the determination.

29. The non-transitory computer-readable medium of claim 25, wherein the instructions are further executable by the one or more processors to:

determine that the quantity of different sizes of the plurality of downlink control information messages satisfies the threshold after performing the first size alignment operation and the second size alignment operation;

determine, based at least in part on determining that the quantity satisfies the threshold after performing the first size alignment operation and the second size alignment operation, a first size of the quantity of different sizes of the plurality of downlink control information messages included in the first set of downlink control information messages and a second size of the quantity of different sizes of the plurality of downlink control information messages included in the second set of downlink control information messages; and perform a third size alignment operation by padding the first size or the second size with a quantity of filler bits such that the first size and the second size are equal.

30. The non-transitory computer-readable medium of claim 25, wherein the first set of downlink control information messages that schedule the single cell are associated with a first set of control channel elements and the second set of downlink control information messages that schedule the set of cells are associated with a second set of control channel elements different from the first set of control channel elements.

* * * * *